Figure 1:
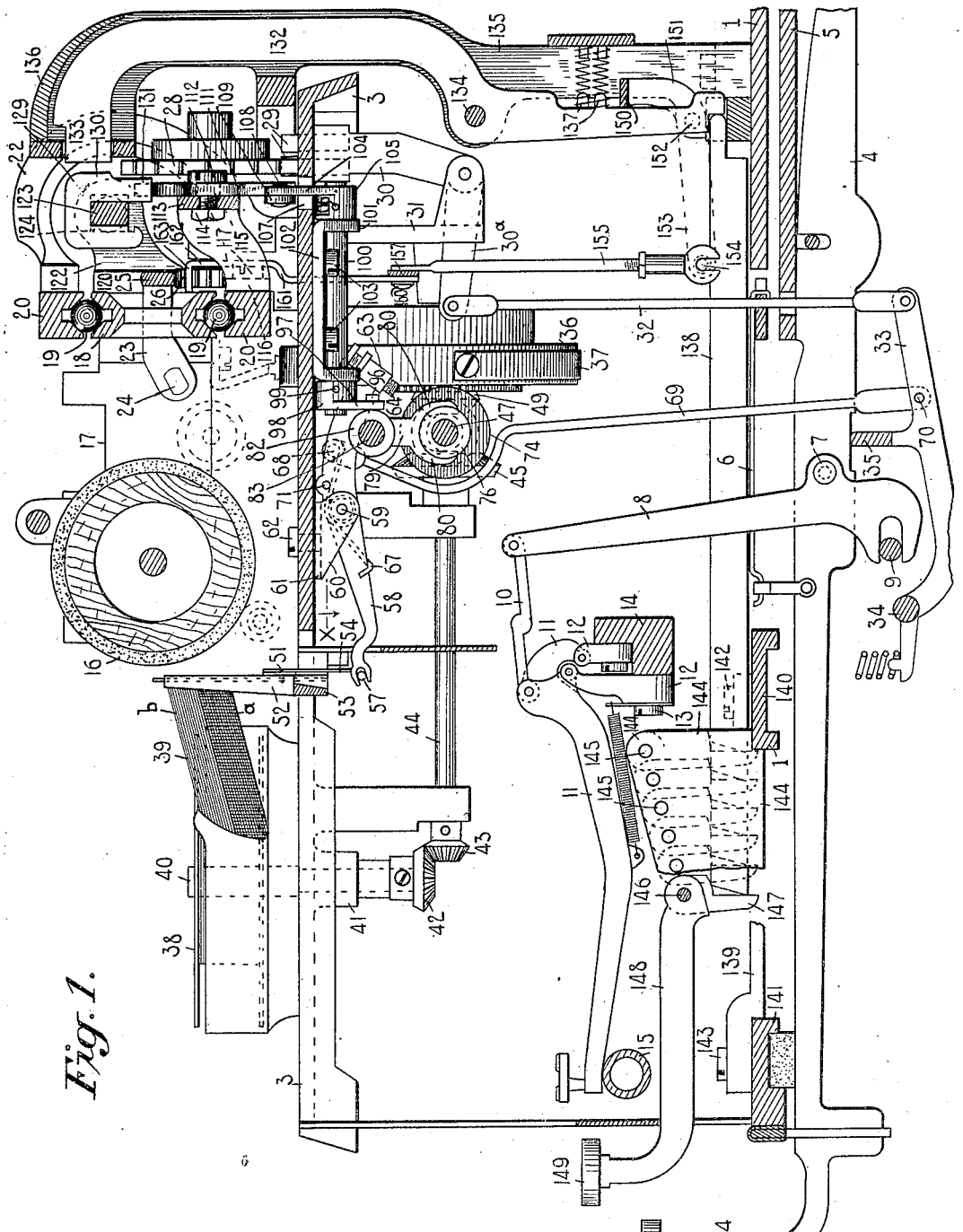

No. 878,163. PATENTED FEB. 4, 1908.
H. H. STEELE.
TYPE WRITING MACHINE.
APPLICATION FILED SEPT. 1, 1906.
5 SHEETS—SHEET 2.
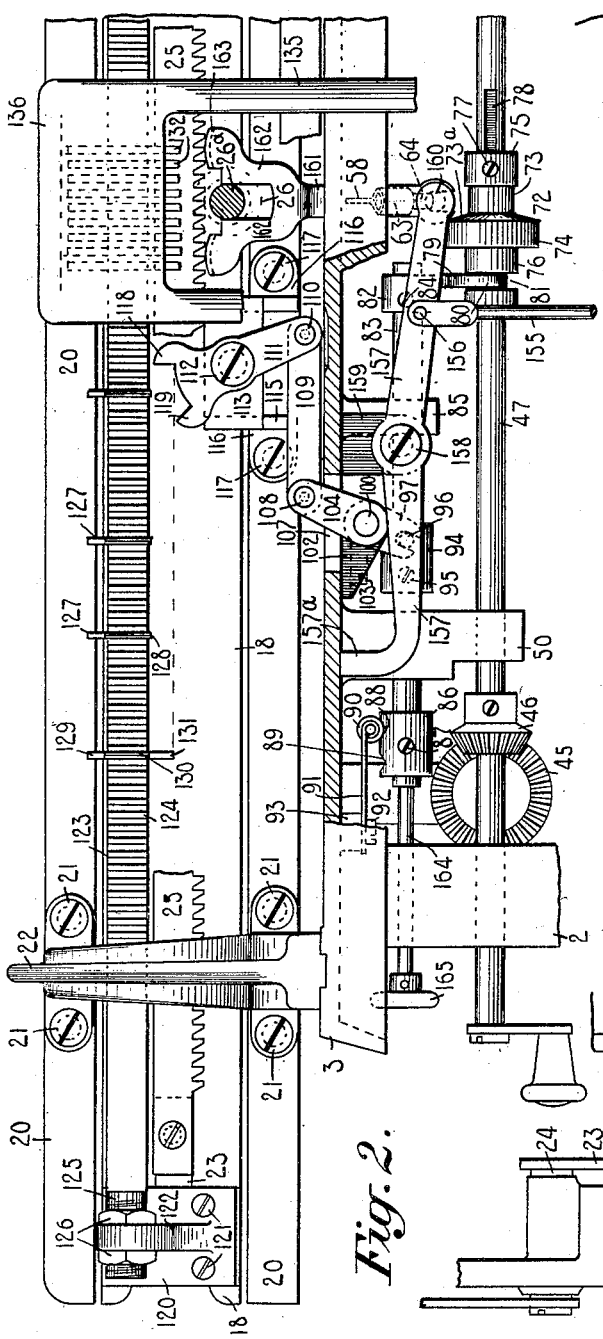
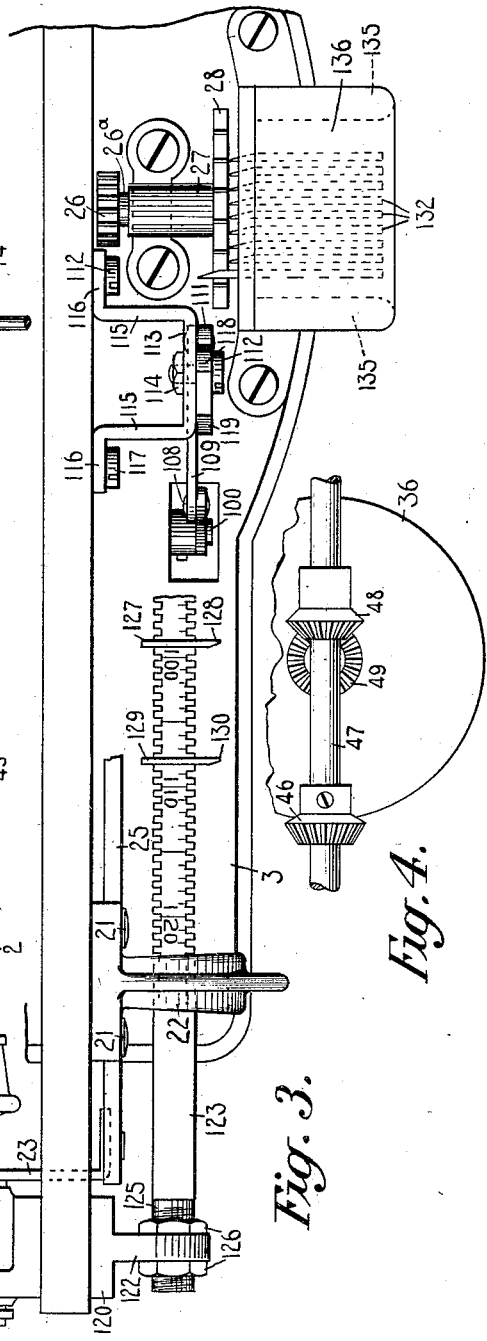
WITNESSES:
M. F. Hansweber
E. M. Wells
INVENTOR.
Herbert H. Steele
BY
Jacob Felbel
ATTORNEY.

No. 878,163. PATENTED FEB. 4, 1908.
H. H. STEELE.
TYPE WRITING MACHINE.
APPLICATION FILED SEPT. 1, 1906.
5 SHEETS—SHEET 3.
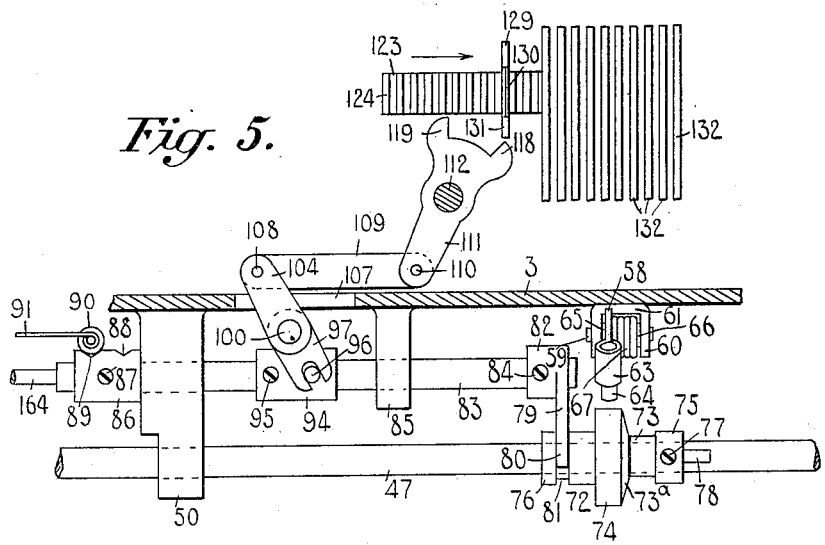
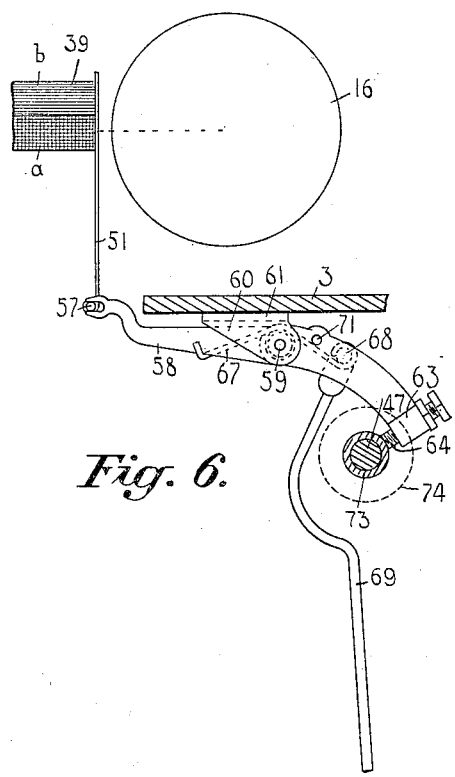
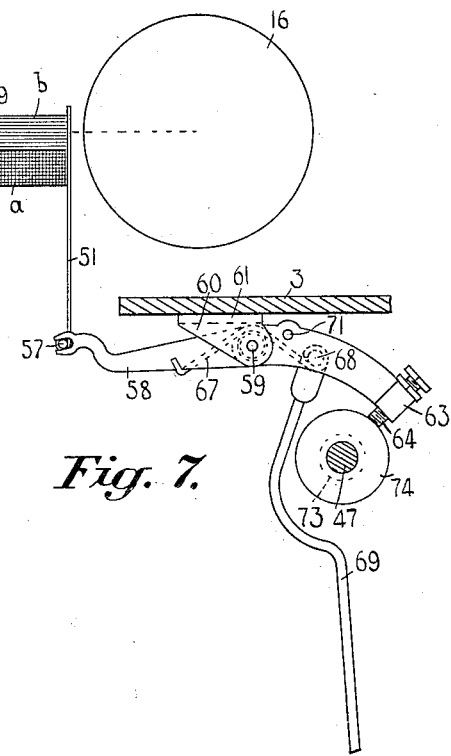
WITNESSES:
M. F. Hanmueber
E. M. Wells.
INVENTOR.
Herbert H. Steele
BY
Jacob Felbel
ATTORNEY.

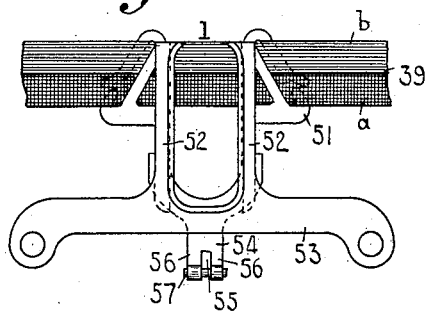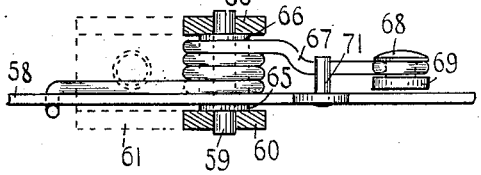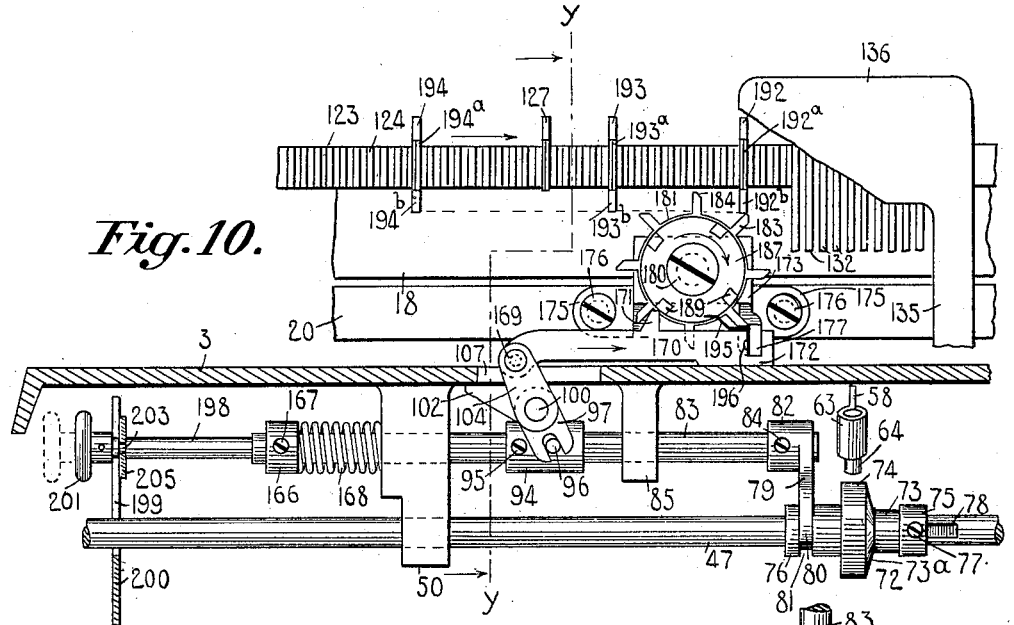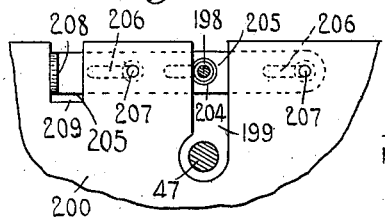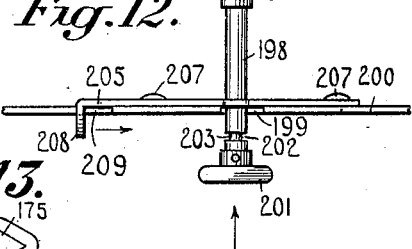

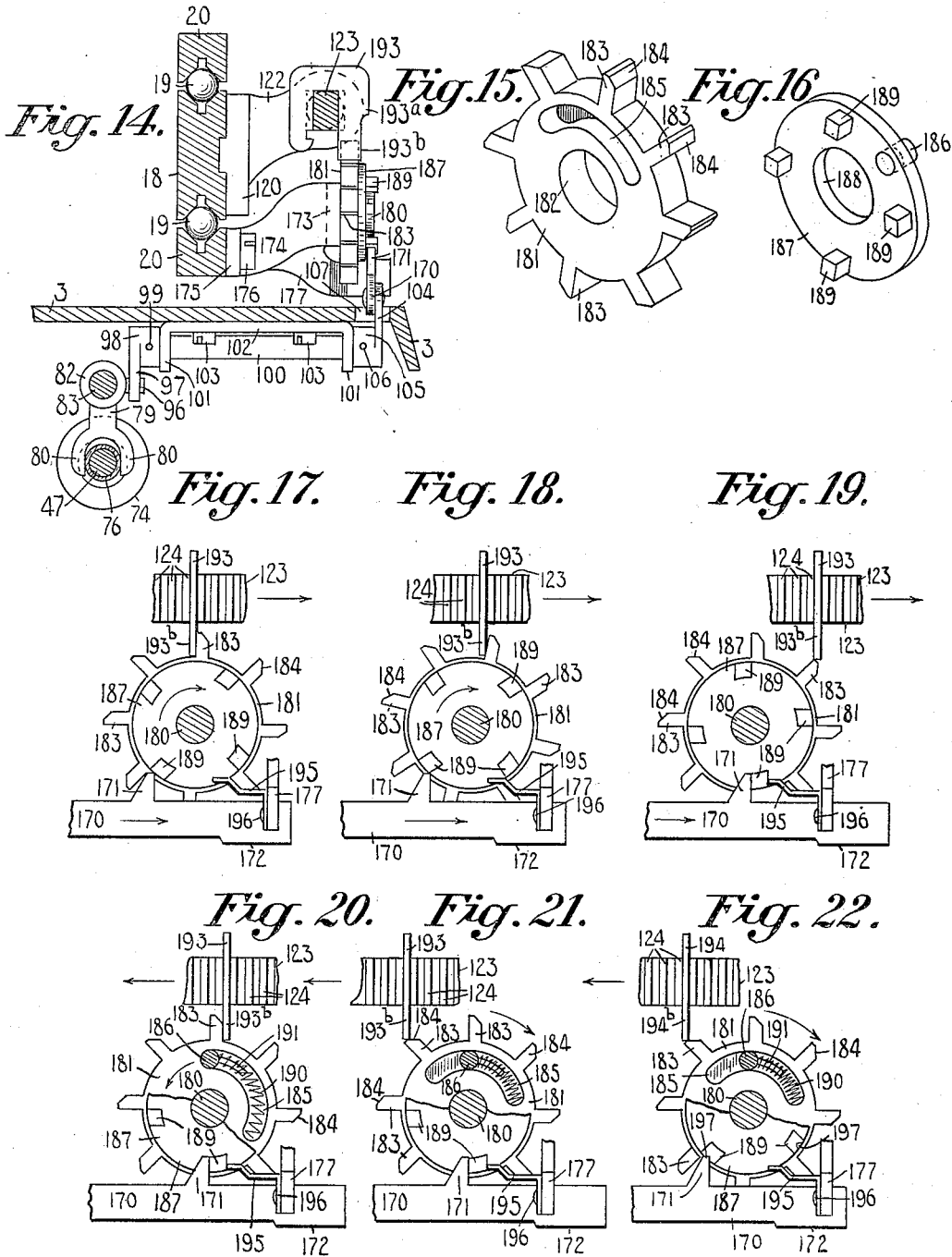

UNITED STATES PATENT OFFICE.

HERBERT H. STEELE, OF SYRACUSE, NEW YORK, ASSIGNOR TO THE MONARCH TYPEWRITER COMPANY, OF SYRACUSE, NEW YORK, A CORPORATION OF NEW YORK.

TYPE-WRITING MACHINE.

No. 878,163.      Specification of Letters Patent.      Patented Feb. 4, 1908.

Application filed September 1, 1906. Serial No. 332,949

*To all whom it may concern:*

Be it known that I, HERBERT H. STEELE, citizen of the United States, and resident of Syracuse, in the county of Onondaga and State of New York, have invented certain new and useful Improvements in Type-Writing Machines, of which the following is a specification.

My invention relates to ribbon mechanism for typewriting machines and in general terms has for its object to provide means for changing or shifting automatically at a predetermined point or points in the line of writing from one character to another of printing or of inking means having a plurality of characteristics, or more specifically from one field to another of a ribbon having a plurality of fields of different characteristics.

To the above and other ends the invention consists in the features of construction, combinations of devices and arrangements of parts hereinafter fully described and particularly pointed out in the claims.

I have shown my invention as applied to a No. 3 Monarch front-strike typewriting machine, which machine employs a vibratory ribbon carrier normally maintaining the ribbon away from the printing point; but it is to be understood that the invention is applicable to other forms of writing machines and that in its broader aspects said invention may be applied to machines which do not employ a vibratory ribbon carrier as well as to machines of the Monarch style or class.

In carrying out my invention in the present instance two or more coöperating shifting members are provided, one or more on the traveling element or carriage of the machine and one on a fixed part thereof, said shifting members being relatively adjustable so that they may co-act at varying points in the carriage travel to effect an alteration in the throw of the vibratory ribbon carrier, whereby the working field or stripe of the ribbon, or that field which is presented to the action of the types, may be changed automatically at one or another of a plurality of predetermined points in the line of writing.

My ribbon field-changing improvements are preferably made use of in connection with tabulating devices, the tabulating devices employed in the present instance comprising coöperating stops which arrest the carriage in predetermined columnar positions when it is released from its step-by-step feeding mechanism. Preferably I employ certain of said tabulating stops as one or more of the shifting members before referred to, the parts so co-acting that if, for example, a two-color ribbon be used, the characters in one column on the work sheet may be written in one color while the characters in an adjacent column may be written in another color, thereby obtaining results which are particularly useful and convenient in various forms of commerical typewriting.

In the accompanying drawings, Figure 1 is a full-sized longitudinal vertical sectional view of a typewriting machine embodying my invention, parts of the machine being omitted and parts being broken away. Fig. 2 is a full-sized fragmentary rear elevation showing the upper part of the machine, parts being omitted and parts being broken away. Fig. 3 is a top plan view of some of the parts shown in Fig. 2. Fig. 4 is a fragmentary front elevation of part of the mechanism for feeding the ribbon longitudinally. Fig. 5 is a diagrammatic rear view of parts of the ribbon field-changing or shifting mechanism, some of the parts being shown in different relations from those in which they appear in Fig. 2. Figs. 6 and 7 are diagrammatic side views illustrating different positions of the vibratory ribbon carrier and its operating devices. Fig. 8 is a full-sized front elevation of the vibratory ribbon carrier and the guide bracket in which said carrier is supported, a part of the ribbon carried by said vibratory carrier being shown. Fig. 9 is an enlarged sectional view taken on a plane represented by the line $x$ in Fig. 1 and looking in the direction of the arrow at said line. Fig. 10 is a fragmentary rear elevation, partly in section, showing the upper part of a typewriting machine embodying a modified construction of my invention. Fig. 11 is a detailed side view, partly in section, of a part hereinafter termed a locking plate, operative in connection with the modified construction of Fig. 10, a part of the side plate on which said locking plate is supported being shown. Fig. 12 is a top plan view of some of the parts shown in Fig. 10 and showing also the finger button and rod for manually controlling the ribbon field-changing mechanism. Fig. 13 is an enlarged fragmentary perspective view of the supporting bracket on which a part hereinafter termed a rotary ribbon field-changing member and shown in rear elevation in Fig. 10 is journaled. Fig. 14 is a sectional view taken on a plane represented by the line *y—y* in Fig. 10 and looking in the direction of the arrows at said line, certain parts shown in the latter figure being omitted in Fig. 14. Figs. 15 and 16 are enlarged perspective views of the two parts of a device, hereinafter termed a rotary ribbon field-changing or shifting member, employed in the modified construction. Figs. 17, 18 and 19 are diagrammatic views illustrating the relations of certain parts of the modified ribbon field-changing mechanism at various stages during the movement of the carriage in printing direction, or from left to right as viewed from the front of the machine, said figures being rear views. Figs. 20 and 21 are diagrammatic views representing the relations of certain parts of the ribbon field-changing mechanism at various stages during the return movement of the carriage from left to right, said figures being rear views. Fig. 22 is a diagrammatic rear view illustrating a modified form of rotary ribbon shifting member.

Two forms of my invention are shown in the present application. The first form, illustrated in Figs. 1 to 9, inclusive, will now be described.

As shown in Figs. 1 and 2 the main frame of the machine comprises a base 1, corner posts 2, of which only one is shown, and a top plate 3 supported by said corner posts. Key levers 4 are fulcrumed on a fulcrum plate 5 mounted in the rear of the base, each of said key levers being provided with a restoring spring 6. Pivoted at 7 to each key lever is a sub-lever 8 which is slotted at its lower end portion to coöperate with a fixed abutment 9 supported at the sides of the base. The upper end of each sub-lever is connected by a link 10 with a type bar 11, said type bar being pivotally mounted in a hanger 12 secured by a screw 13 to a segmental hanger support 14. The hangers are arranged in arcs of circles on the support and the free ends of the type bars 11 are normally supported on a type rest 15, said type bars, when actuated, coöperating with the front face of a rotary platen 16 mounted in a U-shaped platen frame or carriage composed of side bars 17 and a rear bar 18 connecting said side bars. The rear bar 18 is provided at its top and bottom with oppositely disposed longitudinal grooves which coöperate with anti-friction balls 19, said balls also coöperating with fixed grooved rails or track-ways 20 secured by screws 21 to rearwardly curved standards 22 rising from the top plate 3.

Horizontally disposed and rearwardly projecting arms 23 are pivoted at 24 in side bars 17 of the carriage, said arms 23 supporting at their rear ends a carriage rack 25 which normally meshes with a feed pinion 26 secured to a shaft 26ª (Figs. 2 and 3) journaled on a bracket 27 rising from the top plate. A toothed escapement wheel 28 is operatively connected with the shaft 26ª and coöperative with said escapement wheel are escapement dogs 29 mounted at the top of a vibratory dog carrier or rocker 30 pivotally mounted in a supporting bracket 31 depending from the top plate. The dog rocker is provided with a horizontally disposed and forwardly projecting arm 30ª which is connected by a link 32 with a central, rearwardly extending arm 33 of a universal bar frame, said frame comprising a rock shaft 34 journaled at the sides of the base and a universal bar proper 35 extending from side to side of the machine beneath the series of key levers 4. The universal bar is adapted to be operated when any of the key levers is actuated, thereby causing the dog rocker to be vibrated and the dogs 29 to coöperate in a known manner with the escapement wheel 28 to permit the carriage to be drawn a letter space distance at a time leftward across the top plate under the influence of a spring drum 36 with which said carriage is connected by a band or strap 37.

Ribbon spools 38 (only one of which appears in the drawings) are arranged above the top plate, one at each side of the machine and forwardly of the platen. A ribbon 39 is wound upon the ribbon spools, said ribbon as herein shown being divided longitudinally into fields *a* and *b* of different characteristics, that is to say, the field *a* or the lower field may be of one color such as black and the field *b* or upper field of a different color such as red, or the field *a* may be copying ribbon and the field *b* record ribbon, for example. The ribbon 39 may be fed longitudinally from either spool to the other by any suitable means, that shown in the drawings being substantially the same as the ribbon feeding mechanism employed in the Monarch machine. Each ribbon spool 39 is carried by an upright shaft 40 (Fig. 1) which rotates in a fixed bearing 41 and has secured to its lower end a small beveled gear 42. The gear 42 meshes with a beveled pinion 43 secured to the forward end of a horizontal shaft 44 which shaft carries at its rear end a beveled pinion 45, said pinion 45 being adapted to mesh with a beveled driving pinion 46 (Figs. 2 and 4) mounted on a driving or power shaft 47. Rotary movement is transmitted to the shaft 47 by beveled pinions 48 and 49 (Figs. 1 and 4), the pinions 48 being operatively connected with the driving shaft and the pinion 49 with the spring drum 36. It will be understood that both ribbon spools are provided with like gear trains which are adapted to be actuated by driving pinions 46 on the shaft 47. Said shaft is journaled in lugs 50 depending from the under side of the top plate and is capable of both longitudinal and rotary movements in its bearings, the longitudinal position of said shaft determining which driving pinion 46 will be in mesh with its coöperating pinion 45 and which ribbon spool will be turned to wind the ribbon thereon.

Midway between the ribbon spools the ribbon 39, as best shown in Figs. 1 and 8 is threaded through a vibratory ribbon carrier or vibrator 51, said vibrator being guided and supported in the upright arms 52 of a guide bracket 53, the latter being suitably secured to the top plate of the machine. The stem 54 of the carrier or vibrator is formed with a slot 55, thereby providing arms 56 which carry a cross pin 57, said cross pin being engaged by the slotted forward end of an operating member or lever 58 which has a pivot or fulcrum pin 59 journaled in the arms 60 of a U-shaped bracket 61 depending from the under side of the top plate and secured thereto in a fixed relation by a headed screw 62.

As will be seen the operating lever 58 is pivoted about midway between its ends, thus providing a two armed lever. The free end of the forward arm of said lever is pivotally connected with the vibrator 51 and the free end of the rear arm of said lever is curled or turned back on itself as indicated at 63 to provide an opening the interior of which is threaded and receives an adjustable screw stop 64, which, during the operation of the machine, coöperates with a stop member presently to be described to effect a positive stoppage of the operating lever 58, the screw stop 64 being made adjustable so that the coöperation between it and said stop member may be properly timed. As shown in Fig. 9 limiting collars or sleeves 65 and 66 surround the pivot pin 59 of the operating lever between the arms 60 and serve to prevent lateral movement of said lever towards one or another of said arms. The collar 65 is comparatively narrow and the collar 66 comparatively wide, the latter being at the left of an operating lever and serving to maintain it at a considerable distance from the left-hand arm 60 of the supporting bracket. Coiled around the collar 66 is a wire spring 67, the forward end of which, as clearly appears for example in Fig. 1, is hooked around the lower edge of the operating lever between the pivot of the latter and the vibrator. The rear free end portion of the spring 67 is coiled around a headed pin or stud 68 extending laterally from the upper end portion of a connecting link 69, the lower end of the latter being pivotally connected at 70 with the arm 33 of the universal bar frame, a yielding or swinging connection being thus provided between the connecting link 69 and the operating lever 58. A pin 71, best shown in Fig. 9, projects laterally leftward from the rear arm of the operating lever in position to coöperate with the rear portion of the spring 67 to prevent the latter from uncoiling and to limit the upward movement of the link 69 under the influence of said spring 67. The pin 71 enables the spring to have an initial tension and affords a definite relation between the link 69 and lever 58 in normal position. The construction, it will be understood, is such that when a key lever or the spacing levers (not shown) are operated the link 69 will be drawn downward and through the spring 67 will actuate the operating lever 58, causing the forward arm of the lever to swing upward and the rear arm of the lever to swing downward. The normal position of the vibrator is such that the ribbon is normally maintained below the printing point, but when the operating lever is actuated the vibrator will be thrown upward to interpose the ribbon between the types on the actuated type bar and the front face of the platen.

When a ribbon like 39 having longitudinal fields or stripes of different characteristics or colors is employed in a machine having a vibratory ribbon carrier it is necessary to vary the throw of the carrier in order to bring one field or another of the ribbon to the printing point. In the present instance I prefer to effect this result by providing a stop member adjustable to coöperate with the stop 64 to arrest the operating lever 58 at different points in its travel from a single normal position. It is to be understood, however, that this is only one way of effecting the change or shift in the ribbon field and that various other ways of accomplishing this result may be used within the broader aspects of my invention. The stop member or ribbon field-changer herein illustrated is clearly shown in Figs. 1, 2 and 5 and is designated as a whole by the numeral 72. Said stop member is in the form of a sleeve which is mounted on the ribbon driving shaft 47 and comprises a cylindrical stopping portion 73 of comparatively small diameter, a larger cylindrical stopping portion 74 joined to the portion 73 by a coned part 73$^a$, a hub portion 75 adjoining the stopping portion 73 and a second hub portion 76 at the left of the cylindrical stopping portion 74. The hub portion 75 receives a screw 77, the inner end whereof engages with a slot 78 formed in and extending longitudinally of the driving shaft 47, the construction being such that the stop member 72 may be moved lengthwise of said driving shaft and relatively thereto but is caused to turn with said shaft when the latter is rotated. It will be apparent that by moving the stop member 72 lengthwise of the driving shaft one or another of the stopping portions 73 and 74 will be brought into position to coöperate with the screw stop 64 when the operating lever is actuated by any of the key levers. The construction is such and the parts are so proportioned that when the operating lever is arrested by the stop portion 73 the ribbon will have been lifted far enough to bring the bottom field or stripe $a$ to the printing point while if the stop portion 74 is operative the operating lever will be arrested by the larger stopping portion 74 and the ribbon will not be lifted so high but will be thrown only far enough to bring the upper field or stripe $b$ into the path of the types.

Briefly expressed, one of the chief ends sought by my present invention is to effect an automatic change or shift from one ribbon field or stripe to another, whether these ribbon fields are on the same or on separate ribbons, or from one character of inking means, or one character of printing, to another at a predetermined point or points in the travel of the carriage or in the line of writing. In the present instance I effect this object by providing devices which operate to shift the stop member 72 lengthwise of the driving shaft to bring one or another of the stop portions 73 into operative position, said devices being automatically actuated by adjustable devices carried by the traveling element or carriage of the machine. As the invention is shown carried out in the present case, it will be noted that when the automatically operating shifting devices operate during the actuation of the tabulating devices or of the printing keys the ribbon is not bodily or physically shifted simultaneously thereby to change from one field to another, but that by said shifting operation provision is made for a different throw of the ribbon when subsequently a writing key is struck. Thus in substance and effect the ribbon is shifted or changed by said shifting devices to cause a change of field, this change or shift from one ribbon field to another taking place automatically during the operation of the machine. But I do not intend my generic claims to be interpreted to cover only a mechanism of the specific type in which I have herein shown my invention embodied. The automatic shifting means for the stop member 72 comprises a vertically disposed arm 79 bifurcated at its lower end, the arms 80 of the bifurcation extending into a circumferential groove or depression 81 formed in the hub portion 76 of the stop member 72 as shown in Figs. 1, 2 and 5.

The upper end of the arm 79 is provided with a collar 82 formed with a central opening which receives the inner end of a slide rod 83, said arm 79 being held in a fixed relation with the slide rod by a set screw 84 which passes through the collar portion 82 and abuts against said slide rod. Said slide rod has its bearings in the right-hand lug 50 of the pair in which the driving shaft 47 is journaled and in a smaller lug 85 depending from the under side of the top plate at the left of the right-hand lug 50.

As will be seen from an inspection of Fig. 2 the slide rod 83 extends from near the middle of the machine horizontally towards the right, and near its right-hand end portion said slide rod has a collar 86 secured to it by a set screw 87, said Fig. 2, it will be recalled, being a rear view. The top of the collar is formed with two V-shaped depressions or notches 88 and 89. Coöperative with said notches is a roller detent 90 mounted at the free end of the spring arm 91 which is secured by a headed screw 92 to a lug 93 depending from the top plate. The construction is such that when the slide rod is shifted lengthwise to and fro as presently to be described, it will be maintained against accidental displacement in either of the positions to which it may be moved by the coöperation between the detent 90 and one or another of the notches 88 and 89.

A collar 94 is mounted on the slide rod 83 between its bearing lugs, said collar being secured in a fixed relation with said slide rod by a set screw 95. Projecting horizontally from the rear of the collar 94 is a pin or stud 96 which serves to connect the slide rod with devices for actuating it automatically. Said devices, as shown in Figs. 1, 2 and 5, comprise a crank arm 97 forked at its lower end portion to embrace the stud 96 and provided at its upper end with a lateral collar portion 98 which is secured by a pin 99 to the forward end of a horizontally disposed rock shaft 100, said rock shaft being journaled in the depending arms 101 of a U-shaped bracket 102 which is secured by headed screws 103 to the under side of the top plate. A crank arm 104 is provided at its lower end with a collar portion 105 which is perforated to receive the rear end portion of a rock shaft 100. The crank arm 104 is secured in a fixed relation with the rock shaft by a pin 106 passing through the collar 105. The crank arm 104 is oppositely disposed to the crank arm 97 and extends upwardly through a slot or opening 107 in the top plate 3.

As will be understood from a consideration of Fig. 1, the rock shaft is prevented from moving endwise in its bearings by the collar portions 98 and 105 of the respective crank arms 97 and 104, said collar portions abutting against the outer faces of the bracket arms 101. It will further be apparent that the crank arms 97 and 104 and the rock shaft 100 constitute in effect a single lever with an elongated fulcrum or pivot. The upper end portion of the crank arm 104 is pivotally connected by a loose rivet 108 with one end of a link 109 arranged horizontally above the top plate and connected at its other end by a loose rivet 110 with a shifting member or lever 111 which is pivoted on a headed shouldered screw 112. The end of said shouldered screw is reduced and threaded and engages in a tapped hole in the cross plate 113 of a U-shaped supporting bracket, a nut 114 (Fig. 1) engaging with the forward end of the reduced portion of the screw 112 at the opposite side of the plate-like portion 113 and serving to secure said screw in a fixed relation with said plate. It will be seen that the lever 111 is confined between the rear face of the part 113 and the under side of the head of the screw 112 so that said lever may turn freely on said screw but is held from movement axially thereof. The U-shaped bracket in addition to the plate-like portion 113 comprises curved side arms 115 (Figs. 1, 2 and 3) projecting forwardly and downwardly from the ends of the plate-like portion 113, said arms terminating in angularly disposed tabs or ears 116 which are perforated to receive headed screws 117, said screws entering tapped holes in the lower guide rail 20 and serving to maintain the U-shaped bracket in a fixed relation with said guide rail.

It will be noted from an inspection of Figs. 2 and 3 that by the construction described the shifting member or lever 111 is mounted on a fixed part of the machine somewhat to the right of the middle thereof. The upper end portion of said lever 111 is provided with extensions or lugs 118 and 119 having inner oppositely disposed contact faces which are in planes radial of the center about which the lever 111 turns, said center being the axis of the shouldered screw 112. Said lugs or extensions 118 and 119 are spaced apart as clearly appears in Figs. 2 and 5 to permit of the coöperation of either one of them, without interference by the other, with one or more coöperating shifting or contact members mounted on the carriage.

Before entering into a detailed description of the shifting or contact members carried by the carriage, it may be well to state that although the carriage may be moved in printing direction either by hand or a letter space distance at a time under the control of the step-by-step feeding mechanism, to bring about a coöperation between the shifting member on the frame and one or another of the shifting members on the carriage, yet I prefer to employ tabulating devices to cause movements of the carriage when it is desired to shift automatically from one ribbon field to another or, in other words, to change the character of inking means, as such automatic shifting is preferably used in statement, manifest or other tabular work and work of this character is facilitated by the use of tabulating mechanism. The tabulating mechanism shown in the present case is substantially the same as that employed in the No. 3 Monarch typewriter and forming the subject-matter of a pending application of Jacob Felbel, Serial No. 270527, filed July 20, 1905. Said tabulating mechanism comprises a plurality of stops, commonly called column stops, which are mounted on the carriage and which coöperate with a plurality of stops commonly called denominational stops mounted on the frame of the machine. In the form of my invention now under consideration I prefer to slightly modify one or more of said column stops and to make use of them as shifting members to coöperate with the shifting member or lever 111 on the frame to effect an automatic shift of the ribbon fields.

As is well understood, the column stops, presently to be described in detail, are adjustable to assist in defining columnar fields; and it will be apparent from what has been said that when one or another of the modified or special column stops which I prefer to employ is adjusted, it not only assists to define a columnar field but also operates to effect an automatic shifting or changing of the ribbon fields so that the printing in the defined columnar field will be in a different color from the writing which has immediately preceded. This I consider a valuable feature of my invention, since by a single adjustment of one of the combined column stop and shifting members I am not only enabled to select a columnar field at any predetermined location in the writing line, but also to cause an automatic shift of the ribbon fields which will become effective in the selected columnar field. In this connection, however, I desire it to be understood that the column stops and shifting members need not be combined in the manner referred to but may, if preferred, be independent devices separately adjustable as shown in other applications of mine co-pending herewith, and bearing Serial Nos. 332,950 and 332,951, both filed September 1st, 1906.

The tabulating mechanism above referred to will be described briefly and only so far as is necessary to an understanding of its operation in connection with the automatic ribbon field-changing or shifting devices with which the present application is more especially concerned.

Referring to Figs. 1 to 3 inclusive and Fig. 5, brackets 120 are secured by headed screws 121 at the back of the rear bar 18 of the carriage near the ends thereof. Said brackets 120 are formed with rearwardly extending arms 122 which are perforated to receive the end portions of a rectangular column stop bar 123 provided at its front and rear sides with oppositely disposed teeth 124. The end portions 125 of the column stop bar are cylindrical in shape and are threaded to coöperate with adjusting and securing nuts 126, two of said nuts coöperating with each end portion 125, one nut at each side of the associate bracket arm 122 and abutting against said arm. The stop bar 123 is adapted to carry one or more adjustable flat column stops 127, said column stops being received in openings between the teeth 124 of the stop bar and each having a stopping portion 128 which is coöperative with the denominational stops presently to be described.

In addition to the column stops 127 which are of the usual form, the stop bar 123 is adapted to support a special stop member 129. Said member is made preferably of sheet metal and generally resembles the column stops 127, being adapted to fit down over the stop bar 123 between the teeth 124 thereof and having a stopping portion 130 coöperative with the denominational stops. Said special member 129, however, differs from the regular column stops in that it is provided with a depending contact, extension or shifting arm 131 which extends some distance below the bottom face of the stop bar 123 into position to coöperate with the upper arm of the ribbon shifting member or lever in a manner hereinafter described. It will be understood that the special member 129 combines the functions of a tabulating stop and a shifting member and that it is adjustable lengthwise of the stop bar 123 and consequently of the carriage in which said stop bar is supported. Said member 129 may be arranged at the right of the ordinary column stops 127 as shown in Fig. 2, which figure it will be recalled is a rear view, or may be arranged intermediate such ordinary column stops.

It will be clearly understood from an inspection of Fig. 1 that the curved standards 22 permit of the free and unobstructed passage of the stop bar 123 and the devices supported thereon as the carriage travels to and fro across the top plate. During the travel of the carriage from left to right the column stops 127 and the member 129 are adapted to coöperate with a set of denominational stops, said stops being in the form of upright levers 132 having forwardly curved stopping portions 133, said levers being pivoted between their ends at 134 in a supporting frame or bracket comprising side arms 135 joined at their tops by a part 136 which serves as a hood or housing for the upper ends of the levers 132, said bracket being suitably secured to the frame of the machine at the rear thereof. Coiled springs 137 coöperate with the lower arms of the stop levers 132 to maintain the stopping portions 133 normally out of the path of the column stops 127 and the special member 129. Operative on the end portion of the lower arm of each denominational stop lever 132 is a slide bar 138 mounted to slide in guide ways in a frame 139 which is suitably secured to transverse frame bars 140 and 141 by screws 142 and 143, there being one slide bar for each denominational stop member.

Rising from the guide frame 139 are webs or brackets 144 which are perforated as shown at 145 to provide bearings for rock shafts 146. Fixed to each rock shaft is a downwardly extending arm 147 arranged to coöperate with the forward end of one of the slide bars 138. Each rock shaft has fixed to it also a horizontally disposed and forwardly extending lever arm 148 which has an upwardly curved portion terminating in a tabulating key 149, the series of tabulating keys being disposed at the rear of and above the last row of keys in the regular keyboard of the machine. It will be understood that when a tabulating key is operated it turns its associated rock shaft 146 in its bearings, causing the arm 147 fixed to said rock shaft to push the associate slide bar 138 rearwardly, said slide bar actuating its denominational stop lever 132 and swinging the lower arm of the latter rearwardly and the upper arm of the latter forwardly about the pivot 134 and bringing the stopping portion 133 of said lever into the path of the stopping portion 128 of the column stops and also into the path of the stopping portion 130 of the special member 129. In order to bring the coöperative tabulating stop members into engagement it is necessary to effect the release of the carriage from its step-by-step feeding mechanism. Said release is accomplished by means comprising a universal bar 150 arranged behind and transversely of the lower arms of the stop levers 132 in position to be actuated by each of said lower arms when it is moved rearwardly as just described (Fig. 1). The universal bar 150 is mounted in the supporting frame or bracket in which the denominational levers are pivoted, said bar having an arm 151 depending from it at each end and pivoted at 152 in said supporting frame. Only one of said arms 151 is shown in the present case. Extending horizontally from the right-hand arm 151 and forming a continuation of said arm forward of its pivot 152 is an arm 153 provided at its free end with a laterally projecting pin 154 coöperative with the slotted lower end of a vertically disposed link 155 and operating to raise said link when the universal bar 150 is actuated. The upper end of the link 155 is connected at 156 (Fig. 2) with a lever 157 pivoted between its ends at 158 in a bracket 159 depending from the top plate. The right-hand arm of said lever 157 terminates in a stopping portion 157$^a$ which serves to limit its movement in one direction, while the end of the left-hand arm of said lever is pivotally connected at 160 with the lower end of a lifting member 161. The upper part of the member 161 is bifurcated, the arms 162 of the bifurcation embracing the shaft 26ª and bearing thereon when the member 161 is vertically reciprocated. The upper end portions of the arms 162 are bent forwardly at right angles to provide lifting shoes 163 which normally lie beneath and out of contact with the teeth of the feed rack 25.

When one of the tabulating keys 149 is operated the lower arm of the associate lever 132 is swung rearwardly thereby operating the lever comprising the arms 151 and 153, the arm 153 swinging upwardly about the pivot 152 and raising the link 155. Said link operates on the lifting member 161 through the lever 157, causing the lifting shoes 163 to engage the rack 25 to swing the latter upwardly about its pivots 24 until it is disconnected from the feed pinion 26, thereby effecting a release of the carriage. The parts are so arranged that prior to the release of the carriage from its step-by-step feeding mechanism the actuated denominational stop lever 132 will have been moved so that its stopping portion 133 will be in position to arrest the proximate column stop.

After what has been said, the manner of operating the form of my invention above described will be understood from a brief explanation. Said form is shown as arranged to write the left-hand portion of the work sheet in black and to change automatically to write in red at a predetermined point in the travel of the carriage. The point at which the ribbon field will be automatically changed or shifted will, of course, be determined by the point of location of the adjustable combined column stop and shifting member 129 on the stop bar 123. This point which will be determined by the character of the work, having been decided upon, the member 129 is adjusted at a corresponding point on the stop bar 123 by the aid of the usual scale with which the top of said stop bar is provided, said scale corresponding with the usual carriage or platen scale (not shown). It will be understood that the black side of the sheet or page may be composed of a number of columns and that the red side of the page may also be composed of a number of columns. Accordingly after the member 129, which determines the point of division between the black and red sides, has been adjusted on the stop bar 123, then the necessary column stops 127 may be suitably adjusted on the stop bar 123 at the left of the member 129 to assist in defining the several columns to be written in black and red. Thereafter the work sheet having been entered in the machine and fed around with the platen in the usual manner until the proper position is attained for writing the first item on the sheet, the carriage may be started from the left and the first or black portion of the first line may be written by operating the appropriate key levers or tabulating keys 149 in the usual manner, said tabulating keys when operated serving to cause the associated denominational stop levers to be projected to coöperate with one or another of the column stops 127 at the left of the member 129. Assuming that during the writing of the initial portion of the line, the stop member 72 and the shifting devices, comprising the forked arm 79, slide rod 83, lever arm 104, link 109 and shifting member or lever 111, are in the positions illustrated in Fig. 2, it will be apparent that at printing operation the ribbon vibrator 51 and its actuating devices, comprising the operating lever 58 and the link 69, will be moved from the position shown in Fig. 1 to those shown in Fig. 6, thereby throwing the ribbon from the normal position below the printing point upward until the field a or black field of said ribbon covers the printing point and is in position to coöperate with the type bars.

From a consideration of Fig. 6 it will be apparent that the upward movement of the ribbon is positively arrested by the engagement of the stop 64 on the operating lever 58 with the stopping portion 73 of the stop member 72. It will also be apparent that after the stoppage or arrest of the operating lever 58, further downward movement of the universal bar and the link 69 will be permitted by the spring connection 67 between said link and said operating lever. Let it be assumed that the initial portion of the first line has been written in black with the result that the carriage has been moved some distance from left to right and the member 129 on said carriage has been brought close to the lug 118 of the ribbon shifting member 111. The appropriate tabulating key 149 may now be operated to project the associate denominational stop and release the carriage. Thereupon the main spring will operate to draw the carriage rapidly leftward across the top plate until the stopping portion 130 of the member 129 contacts with the projected denominational stop to arrest the carriage at the columnar position predetermined by the setting or adjustment of the member 129. During the jump or free movement of the carriage leftward as just described, the extension or arm 131 of the member 129 engages with the lug 118 on the lever 111 so that thereafter during the continuation of the leftward movement of the carriage prior to its arrest, the upper arm of the lever 111 will be turned leftward about its pivot 112, (or rightward as viewed from the rear, as in Fig. 2) this leftward movement continuing for some four letter spaces. As the upper arm of the lever 111 is turned, the lug 118 will be gradually turned down out of the path of the extension 131 so that at the end of the four letter space movements said lug 118 will have been moved down so far that the extension 131 will no longer affect it. At the same time that the lug 118 is turned or swung downwardly the lug 119 will be swung upwardly behind the extension 131 in position to coöperate with it on the return movement of carriage. The turning of the upper arm of the lever 111 to the left by the extension 131 causes the lower arm of said lever to swing rightward (or to the left, as viewed in Fig. 2). As the lower arm of the lever turns it operates to move the link 109 substantially lengthwise away from the middle of the machine, said link in turn operating on the lever comprising the crank arms 105 and 97, with the result that the arm 97, which is connected with the slide-rod 83 through the pin 96 and collar 94, moves said slide rod longitudinally inward towards the middle of the machine. Said slide rod as it moves inward operates on the stop member 72 sliding the latter on the driving shaft 47 from the position illustrated in Fig. 2 to that shown in Fig. 5. From an inspection of these two figures it will be seen that the extent of movement of the member 72 right-ward is equal to the distance between the V-shaped notches 88 and 89 in the collar 86 on the slide rod 83, said movement continuing until the roller detent, disengaging from the depression 88, fully engages with the depression 89. The movement of the member 72 just referred to is sufficient to carry the stopping portion 73 out of the path of the screw stop 64 and to bring the stopping portion 74 into the path of said screw stop 64. Consequently during subsequent printing operations in the line of writing the vibrator and its actuating devices will be moved from the positions shown in Fig. 1 to those shown in Fig. 7. From an inspection of the latter figure it will be observed that the operating lever 58, swinging downward until arrested by the contact of the stop 64 with the stopping portion 74, will move through a less distance than it did when the stopping portion 73 was in position, the decreased movement serving to move the vibrator up only far enough to cause the upper or red field *b* to cover the printing point. Consequently the printing of the remaining portion of the line on the work sheet will be in red.

From what has been said it will be understood that according as the shifting member 111 is fulcrumed nearer to or further from the set of denominational stop levers 132, the end of the black part of each line may be written nearer to or further from the beginning of the red portion of the line. This is so because the closer the lug 118 on the member 111 is to the stop levers 132, the more characters can be written in the final black column prior to the engagement of the ribbon shifting member 129 with the lug 118 to automatically shift or change the ribbon fields. In the drawings the bearing bracket supporting the member 111 is shown as mounted some distance at the right of the set of denominational stop levers as this arrangement is conducive to a clear showing, but it is to be understood that the support of the lever 111 may be moved inward nearer to the middle of the machine if desired, thereby enabling the black and red entries to be written closer together.

At the end of a line of writing the automatic shifting devices will be in the positions shown in Fig. 5, for after the disengagement of the member 129 from the lug 118 the following column stops 127 will not affect the lever 111 as they pass over it from left to right. At the end of the line the platen may be line spaced in the usual manner and the carriage restored by hand from left to right to begin the next entry. During the return movement of the carriage the extension 131 on the member 129 will engage with the working face of the lug 119 on the lever 111 and will swing said lever from the position shown in Fig. 5 to the position shown in Fig. 2, restoring the stop member 72 from the position shown in said Fig. 5 to that shown in Fig. 2. Consequently the writing of the first part of the new line will be in black and when said first part has been completed the field changing mechanism will be automatically readjusted as above described to cause the printing of the remainder of the line in red. The operations above outlined may, of course, be repeated as often as desired, the to and fro movements of the carriage causing an automatic shifting or changing of the working field of the ribbon from black to red and vice versa.

At times it may be desirable to print an entire line or succession of lines in a single color and I have provided means for manipulating the form of my invention now under consideration to accomplish this result with facility. Referring to Fig. 2, 164 designates a rod of comparatively small diameter which is fixedly secured at its inner end in the right-hand end of the slide rod 83. The outer end portion of the rod 164 extends through an opening in the right-hand side plate (not shown) of the machine and has fixed to it a finger button 165. When it is desired to dispense with the automatic changing of the field of the ribbon the special member 129 is removed from the stop bar 123, the result being that during the to and fro movements of the carriage the shifting lever 111 will no longer be automatically operated. By pushing in or pulling out the finger button 165, the slide rod 83 may be moved longitudinally to shift the stop member 72 and bring the desired stopping portion 73 or 74 thereon into operative position, said stopping portion, of course, remaining operative until the stop member 72 is again manually shifted. When it is desired to return to the automatic method of shifting or changing the ribbon fields, the member 129 may be again adjusted on the stop bar 123.

It will be seen that in the form of my invention above described I provide means for automatically shifting or changing the ribbon field at a predetermined point during the travel of the carriage in one direction and for automatically re-shifting or changing back to the ribbon field first operative during the return movement of the carriage. It is sometimes desirable to shift and re-shift the ribbon fields during the travel of the carriage in one direction so that alternate entries may be written in different colors. In the form of my invention illustrated in Figs. 10 to 21 and now to be considered, means are provided for shifting and re-shifting the ribbon fields a plurality of times at variable predetermined points in the travel of the carriage in one direction, the ribbon field-changing or shifting means under some conditions being operated during return movements of the carriage and under other conditions not being so operated. In carrying out this second form of my invention I preferably make use of the tabulating devices described in connection with the first form illustrated in Figs. 1 to 9, in this second form employing a plurality of special or contact members similar to the member 129. These special members coöperate with a rotary shifting member in the form of a two-part toothed wheel to give said rotary member predetermined amounts of rotary movement, said rotary member in turn operating on a ribbon field-changing mechanism substantially resembling that above described in such a way that the ribbon field is shifted or altered when the printing instrumentalities are operated after each coöperation between one of the special members and said rotary member during the travel of the carriage in printing direction.

Referring to Fig. 10, it will be seen that the ribbon driving shaft 47 supports the slidable stop member 72 as in the first form, said stop member having stopping portions 73 and 74 coöperating with the stop 64 carried by the vibratory operating lever 58. The stop member 72 is shiftable by means of the forked arm 79 secured to the slide rod 83. In the present instance, however, the stop member 72 is normally spring controlled. A collar 166 is secured by a set screw 167 to the slide rod near its right-hand end and confined between said collar and the bearing lug 50 and coiled around the slide rod 83 is a helical spring 168, said spring acting through the slide rod on the stop member 72 and serving normally to maintain the stopping portion 73 of the stop member in position to coöperate with the stop 64 on the operating lever 58, as shown in Figs. 2 and 6. The result is that under normal conditions the lower or black field $a$ of the ribbon will be operative. In the present case, as in the first form, the slide rod 83 is provided with a collar 94 carrying a pin 96 which engages with a lever comprising a crank arm 97, rock shaft 100 and a second crank arm 104 (Figs. 10–14). The crank arm 104 is pivotally connected at 169 with a slide bar 170 which extends inwardly towards the middle of the machine and is provided with an upwardly extending lug or toe 171 and a downwardly extending bearing portion 172 near its inner end, said bearing portion being adapted to slide back and forth on the top plate 3. A U-shaped bearing bracket, best shown in Fig. 13 and comprising a central portion 173 and side arms 174 terminating in angularly disposed ears 175, is secured to the lower fixed rail 20 by headed screws 176 which pass through perforations in the ears 175 and enter threaded openings in said rail 20 (Figs. 10 and 14). The statement hereinbefore made concerning the positioning of the U-shaped supporting bracket of the first form of my invention at a greater or less distance to one side of the set of denominational stop levers 132 is to be understood as applying also to the U-shaped bearing bracket just described in connection with the form of my invention now under consideration. An arm 177 projects downwardly and rearwardly from one side of the latter U-shaped bracket, said arm being provided with a guide slot 178 which receives the inner end portion of the slide bar 170 and guides and partially supports the latter during its sliding movements.

The central portion 173 of the U-shaped bracket is provided with a tapped hole 179 which receives a headed and shouldered screw 180, said screw serving as a bearing for a rotary ribbon field-changing or shifting member or wheel which is operative on the lug 171 carried by the slide bar 170 and comprising two parts best illustrated in Figs. 15 and 16. As shown in Fig. 15 the main part of the rotary shifting member comprises a wheel 181 having a central bearing opening 182 and provided with a plurality of radial teeth 183 spaced equally apart, eight of such teeth being shown each beveled at one side as indicated at 184. The rear face of the wheel 181 is formed with a curved slot 185, the center from which the slot is struck being the center of rotation of said wheel. Engageable with the slot 185 is a stud 186 projecting forwardly from the front face of the second part of the rotary member, said second part as shown in Fig. 16 comprising a disk 187 having a central bearing opening 188 and provided with a plurality of lugs or abutments 189 projecting rearwardly from its rear face or oppositely to the pin or stud 186. Four of said lugs 189 spaced equal distances apart are shown in the drawings, each of said lugs being substantially square in cross section. The two parts 181 and 187 of the rotary shifting member are adapted to be mounted face to face on the U-shaped supporting bracket as best shown in Fig. 14, being confined between the rear of the central portion 173 of the bracket and the under side of the head of the bearing screw 180 in such a way that the two parts 181 and 187 may turn freely on said screw but are held against movement axially thereof. The two parts 181 and 187 of the rotary member are adapted to turn together and are also arranged so that a relative movement may be effected between them, this latter being for the purpose of allowing return movements of the coöperating shifting members carried by the carriage of the machine.

Before the wheel 181 and the disk 187 are arranged face to face with the stud or pin 186 engaged with the slot 185, a helical spring 190 of fine wire is arranged in the slot 185 as shown in Fig. 20, said spring normally operating to force the pin 186 against one end of the slot 185, as shown in said Fig. 20. If preferred, the pin or stud 186 may have fixed in it as shown in Fig. 20 a fine guiding pin 191 which extends lengthwise of the slot 185 and is curved in conformity therewith. The spring 190 is coiled around said pin 191 which serves to guide and control the spring and cause it to coöperate properly with the stud 186. The operations which are effective to cause a relative movement between the toothed wheel 181 and the disk 187 and the purpose thereof will be more clearly understood from a description to be given later. At this stage it is sufficient to state that during the movements of the carriage in printing direction, the two parts 181 and 187 are maintained together in the relations shown in Figs. 20, 10 and 17 to 19 inclusive. From an inspection of these figures it will be noted that when viewed from the rear, the four lugs or abutments 189 are each positioned slightly to one side of one of the teeth 183 and that the remaining four teeth 183 are further away from and alternate between the lugs 189, said remaining four teeth 183 also alternating with the other four teeth 183. Maintained in this relation by the spring 190 during the travel of the carriage in printing direction, the two parts 181 and 187 operate as a single member, serving to transmit motion to the slide bar 170 from the special shifting members mounted on the stop bar 123.

As has been stated the shifting or contact members mounted on the stop bar 123 are of like construction to the special member 129 employed with the first form. For facilitating description, however, the shifting members in the present form will be given separate numbers, three of said numbers being shown in the drawings and indicated from left to right respectively by the numerals 192, 193 and 194. Each of these members comprises a stopping portion coöperative with the denominational stop levers 132, the stopping portions of said members being numbered respectively $192^a$, $193^a$ and $194^a$. Each of said members is furthermore provided with an extension or contact coöperative with the teeth 183 of the rotary shifting member on the frame of the machine to automatically change or alter the working field of the ribbon as presently to be described, said extensions being numbered respectively $192^b$, $193^b$ and $194^b$. It is to be understood that between any two of the special members, one or more ordinary column stops 127 may be arranged on the stop bar 123 according as one or more adjacent columns are to be written in the same color. Such column stops will coöperate in the ordinary manner with the denominational stop levers 132 without interfering with the operation of the special members such as 192.

Referring now to the operation of the coöperating shifting members and the parts controlled thereby and assuming that the carriage and the work sheet have been properly positioned for writing the first line of the tabular statement or other matter, the first part of said line may be written by actuating the appropriate character key lever 4 and, if need be, certain of the tabulating keys 149 to cause the carriage to jump or run freely to columnar positions predetermined by the adjustable column stops 127. During the printing and spacing operations just referred to, the stopping portion 73 of the stop member 72 will be in position to coöperate with the stop 64 on the operating lever 58 to positively arrest the latter when the ribbon vibrator has been thrown upward to bring the lower or black field $a$ into printing position. At this time the relation between the two-part rotary shifting member and the slide bar 170 which said member operates, and which in a sense is also a shifting member, will be the same as that shown in Fig. 19, although it is to be understood that none of the special stop members carried by the stop bar 123 will have reached the position of the one shown in Fig. 19 and that said stop member is for the time being to be disregarded. From an inspection of Fig. 19 it will be seen that the lug or toe 171 on the slide bar 170 is engaged with a side face of one of the lugs 189 on the rotary member, and it will also be understood that the coiled spring 168 on the slide bar 83 is at this time exerting a force on the slide bar 170 which tends to press it in the direction of the arrow in said Fig. 19. This spring pressure, of course, will be transmitted through the engaged lugs 171 and 189 to the rotary shifting member, but motion of the latter is prevented by the contact of the other side of the engaged lug 189 with the end of a spring stop 195, which stop is formed of flat spring metal, bent as shown and secured to the guide arm 177 of the U-shaped bearing or supporting bracket by any suitable means, such as a screw 196. It will be understood that the free end of the spring stop arm 195 is adapted to yield or to be cammed downwardly temporarily by the lugs 189 to permit the rotary shifting member to turn in one direction, but that the end of the spring stop 195 coöperates with the sides of the lugs 189 to prevent turning movement of said member in the opposite direction.

The item in the column immediately preceding the column in part defined by the special member 192 having been written in black the appropriate tabulating key 149 is operated to project the associate denominational stop and release the carriage from its step-by-step feeding mechanism. As soon as the carriage is released it will move or jump to the left until it is arrested by the engagement of the stopping portion 192ª of the member 192 with the projected denominational stop on the frame. During the run or jump of the carriage just referred to and prior to its arrest by the co-acting tabulating stops the extension 192ᵇ of the member 192 will engage with the tooth 183 on the rotary member projecting vertically upward into the path of said extension. After the engagement and during the further run of the carriage prior to its arrest, the rotary shifting member will be turned in the direction of the arrow in Fig. 10 and will, because of the engagement of the lower lug 189 with the lug or toe 171 on the slide bar 170, force said slide bar leftward (as viewed from the rear) overcoming the spring 168 which is weaker than the carriage spring. The turning of the rotary member and the consequent leftward movement of the slide bar will continue until the extension 192ᵇ forces the tooth 183 with which it is engaged downward out of its path as indicated in Fig. 10. The leftward movement of the slide bar 170 operates to turn the crank arm 104 to the left as viewed in Fig. 10, rocking the rock shaft 100 and turning the crank arm 97 to the right. The crank arm 97 in turn operates to move the slide rod 83 longitudinally rightward in its bearings with the result that the stop member 72 is slid rightward on the ribbon driving shaft 47. The parts are so proportioned and adjusted that when the amount of rotary movement or turning of the rotary shifting member under the influence of the extension 192 ceases, the member 72 will have been slid rightward to the position shown in Fig. 10, wherein it will be seen the stopping portion 73 has been moved to inoperative position while the stopping portion 74 has been brought into the path of the stop 64 on the ribbon operating lever. The parts between the rotary shifting member and the stopping member 72 will at this time, of course, be in the positions shown in Fig. 10, from an inspection of which it will be seen that the side of the engaged lug 189 has been turned up out of engagement with the right-hand side of the lug or toe 171 on the slide bar and that the outer face of said lug 189 is now in engagement with the edge or corner formed by the junction between the side and top of the toe.

It will be understood that during the turning movement of the rotary member and the sliding movements of the slide bar 170, slide rod 83 and stop member 72, the spring 168 is constantly tending to force these parts in opposite directions from those in which they are moving and that therefore as soon as the extension 192 moves far enough to the right, as viewed in Fig. 10, to disengage from the tooth 183, said spring 168 will restore or force the parts it controls to the positions from which they started, unless such restoring movement is prevented. From a consideration of Fig. 10 it will be seen that the spring 168 tends to force the slide bar 170 back in the direction of the arrow on said slide bar, but that movement of the slide bar is prevented by the engagement of the lug 189 with the corner of the lug or toe 171. The spring pressure tends to force the slide bar rightward between the top surface of the top plate 3 and the outer face of the lug 189, but the vertical distance between the bottom of the slide bar and the top of the toe 171 is greater than the distance between the top plate and the lower portion of the lug 189. The result is that the slide bar will be wedged between the lug and the top plate and will not only be held from movement itself but will hold or prevent the rotary member from turning backward in a direction opposite to the arrow on said rotary member under the influence of the slide bar 170. It will be apparent, however, that the rotary member may be readily turned backward by a force extraneous of the slide bar. By the action and re-action of the rotary member and the slide bar one upon the other, it will be seen that each assists to hold the other from movement and consequently the stopping portion 74 of the member 72 will remain in operative position, shown in Fig. 10, during the writing of the column in the part defined by the member 192, so that said column will be written in red. The entry in said column having been completed, the tabulating devices are again operated to release the carriage which will run freely until arrested by the engagement of the member 193 with the projected denominational stop.

During the run of the carriage and prior to its arrest the extension 193ᵇ will engage with the vertical upwardly extending tooth 183 on the rotary member, as shown in Fig. 17, with the result that during the initial stage of the run of the carriage after such engagement, the rotary member will be turned from the position shown in said Fig. 17 to that shown in Fig. 18. From a consideration of the last named figure it will be seen that this initial turning movement of the rotary member is sufficient to carry the engaged lug 189 upward in the direction of the arrow on the rotary member until said lug passes the edge or corner of the lug 171. This movement of the lug 189 releases the slide bar so that it is free to move rightward or in the direction of the arrow thereon under the influence of the coiled restoring spring 168. During this rightward movement of the slide bar the rotary member will continue to turn under the influence of the extension 193$^b$ with the result that the next succeeding lug 189 will be swung downwardly and, riding over the free end portion of the spring stop 195, will intercept the lug 171 during its return rightward movement. The parts are preferably so proportioned that this interception takes place just as the extension 193$^b$ forces the engaged tooth 183 downward out of its path. The parts will now be in the positions shown in Fig. 19. From a consideration of this figure it will be seen that the lug 189 which is now engaged is held between the end of the stop 195 (which springs back to place as soon as the lug 189 has passed over it to the left) and the face of the toe 171 and that additional rightward movement of the slide bar 170 is prevented. During this rightward movement of the slide bar stop member 72 will be restored by the spring 168 to its first position, thereby rendering the stopping portion 73 again operative and causing the writing in the column in part defined by the member 193 to be in black.

From what has thus far been said it will be apparent that in the column or columns preceding the column in part defined by the member 192 the writing was in black, while for the column defined in part by said member 192 the ribbon fields were automatically shifted so that the writing was done in red, and for the succeeding column in part defined by the member 193 the ribbon fields were automatically re-shifted so that the writing was again done in black. For the column next succeeding that defined in part by the member 193 and which next column, as shown in Fig. 10, is in part defined by the ordinary column stop 27, the writing will continue to be in black since said ordinary column stop has no effect on the ribbon field changing devices. After the writing of the column defined in part by the ordinary stop, however, and during the run of the carriage to the columnar position in part defined by the member 194, the extension 194$^b$ of said member coöperating with the rotary ribbon shifting member on the frame, will turn said member and slide the slide bar 170 from the positions shown in Fig. 19 to those shown in Fig. 10. The result will be that the ribbon fields will again be automatically shifted as previously described and the writing within the column in part defined by the member 194 will be in red. It will, of course, be understood that at this time while the rotary shifting member and the devices controlled thereby for altering the ribbon fields will be in the positions illustrated in Fig. 10, the special members 192, 193 and 194 instead of being in the positions shown in said Fig. 10 will all be at the right of the vertical tooth 183 projecting upwardly from the rotary ribbon shifting member.

Assuming that the red column in part defined by the member 194 be the last or final column on the sheet, the platen may now be line spaced in the usual manner and the carriage restored by hand from right to left to begin a new line or series of entries. During the initial part of the return movement of the carriage the extension 194$^b$ of the member 194 will engage with the vertical upwardly extending tooth 183 of the rotary shifting member and will turn said member in reverse direction until that lug 189 which at the beginning of said reverse turn was in engagement with the toe 171 of the slide bar, will have been moved back until its side engages with the end of the spring stop 195, as shown in Fig. 20. The backward turning of the lug 189 permits the slide bar to move rightward in contact with it under the influence of the spring 168 so that when said lug is arrested by the stop 195 the slide bar 170 will be in engagement with the opposite side of said lug, as shown in Fig. 20. From an inspection of said figure it will be apparent that further reverse turning movement of the rotary member as a whole will be prevented by the stop 195. Because of the yielding or spring connection, however, between the two parts 181 and 187 of the rotary member the carriage is nevertheless permitted to continue its return movement carrying with it the stop bar 123 and the members 194, 193 and 192 which move in the direction of the arrow in Fig. 20. From an inspection of this figure it will be seen that through the engagement of the lug 189 with the stop 195, the disk 187 and the pin or stud 186 carried thereby will be held from movement during this continuance of the returning movement of the carriage. The extension 193$^b$, however, acting on the upstanding tooth 183 of the wheel 181 will turn said wheel in the direction of the arrow in Fig. 20, compressing the spring 190. This turning movement of the wheel 181 will continue until the engaged lower end of the extension 193$^b$ has pushed the engaged tooth 183 downward out of its path and has slid leftward over the bevel 184 at the top of said tooth until it has disengaged therefrom. In Fig. 21, the parts are shown as they appear just prior to said disengagement. From an examination of said figure it will be noted that the slot 185 in the wheel 181 has moved a considerable distance relatively to the pin 186 so that said pin is at this time some distance from the end of the slot with which it normally engages, while the spring 190 has been considerably compressed. As soon as the extension 193$^b$ disengages from the tooth 183 the wheel 181 will be restored to the position shown in Fig. 20 under the influence of the spring 190.

The operations just outlined will be repeated with each of the other special members so that when the carriage is moved far enough rightward to begin the second line the two part rotary member and the slide bar 170 will be in the positions shown in Figs. 20 and 19. As has been said, when said parts are so positioned the ribbon field changing mechanism will be positioned so that the black field of the ribbon will be operative. Consequently the first item or columns of the new line will be written in black as before, and as the writing of the line progresses the ribbon fields will be automatically shifted and re-shifted as before. From what has been said it will be seen that by this form of my invention I provide means for enabling predetermined columns to be written in predetermined colors and a column or columns of one color to be written intermediate columns of a different color; for enabling a ribbon having fields of different characteristics to be automatically changed or shifted so that during the time the carriage is passing through a predetermined columnar field a new ribbon field or stripe will be rendered operative, and then after the carriage has passed through said predetermined columnar field the ribbon will be automatically shifted back to render the original ribbon field again operative; and that shifting members, that is the rotary shifting member or wheel of the slide bar 170, are provided which coöperate to change the relation between the printing instrumentalities and the ribbon fields, the change remaining only so long as the shifting members are in coöperation, means being also provided for again changing the ribbon fields relatively to the printing instrumentalities when coöperation between said members ceases.

If, as may sometimes happen, it is desired to print the first column in the same color as the final column, which in the present case is red, I provide means for accomplishing this result by preventing a movement of the rotary member in return direction under the influence of the various ribbon shifting members on the carriage from the position shown in Fig. 10 (in which position it will be recalled the red field of the ribbon is operative) to the position shown in Fig. 20 wherein the black field is operative. The means is illustrated in Fig. 22 of the drawings and consists of V-shaped notches or depressions 197 cut or otherwise formed in the outer faces of the lugs 189 and coöperative with the edge or corner at the top of the toe 171 on the slide bar 170. It will be observed that the positions of the rotary member and the slide bar 170 in Fig. 22 correspond to the positions of the same parts in Fig. 10, but that in the former figure the corner of the toe 171 instead of resting against the outer surface of the lug 189 as in Fig. 10 is seated in the V-shaped depressions 197 in said lug. Consequently during the return movement of the carriage the extension 194$^b$ on the member 194 instead of coöperating with the upstanding vertical teeth 183 of the rotary member to turn said member as a whole from a position corresponding to Fig. 10 back to that shown in Fig. 20, will be ineffective to turn the disk 187, since said disk will be held by the engagement of the toe 171 with the notch in the lug 189. Consequently the extension 194$^b$ will operate only to turn the wheel part 181 of the two-part rotary member and will effect a relative rotary movement between the wheel part 181 and the disk 187 to the extent indicated in Fig. 22. As soon as the extension 194$^b$ disengages from the tooth 183 the toothed wheel 181 will be restored to its normal relation with the disk 187 by the coiled spring 190. This same operation will be repeated with each of the succeeding shifting members carried by the stop bar 123 with the result that when the carriage reaches the position for beginning a new line the lug 189 on the rotary member and the lug 171 on the slide bar 170 will still be in engagement as shown in Fig. 22. During the subsequent movement of the carriage in printing direction the extension 192$^b$ on the member 192 engages with the upstanding vertical tooth 183, the rotary member will be turned in the direction of the arrow in Fig. 22 and the right-hand side of the V-shaped notch 197 will act on the lug 171 to cam the slide bar 170 far enough to the left to permit said lug 189 to ride over the corner of the lug 171 until a disengagement is effected, whereupon the subsequent operation of the parts will be the same as that hereinbefore described. Certain of the principles of construction and operation of the modification shown in Fig. 22 form part of the subject-matter of a companion application filed herewith and bearing Serial No. 332,951 and are claimed therein.

It will be obvious that the relation between the rotary shifting member and the slide bar or shifting member 170 at the ends and beginnings of the lines of writing may be controlled by employing extra members of the character of the member 192 and its fellows and which are in addition to those shifting members which have the double function of assisting in shifting or changing the fields of the ribbon and in defining columnar fields, said extra members being employed merely to control the relations between the rotary shifting member and the slide bar 170 so as to bring desired ribbon fields into operation. For example, from what has just been said it will be understood that instead of employing the means described in the immediately preceding paragraph for effecting the results attained thereby, the same result might be effected by dispensing with the notches 197 and arranging a special member of the character of 192 on the stop bar 123 in advance of the first stop or member on said bar which is used to assist in defining a columnar field. By employing the advance member in the manner just described, the field changing mechanism will be positioned to cause the writing in the first column of the new line to be in red.

As was said in connection with the first described form of my present invention it may at times be desirable to write an entire line of items or succession of lines in a single color. In order to effect this result in the present instance as in the first form, I provide means for rendering the automatic ribbon field shifting or changing devices inoperative and other means manually controlled for rendering one or another of the ribbon fields operative at will. To render the automatic shifting or field changing devices inoperative it is only necessary, as it was in the first instance, to remove the various ribbon field shifting members 192, 193 and 194 from the stop bar 123. The result of such removal will be that thereafter during the to and fro movements of the carriage, the rotary shifting member on the frame of the machine will not be effected and the ribbon field changing devices operative by said rotary member will not be shifted. If at this time the rotary member and the parts controlled thereby are in the relations shown in Fig. 10 it will be apparent that the red field of the ribbon will be operative. Should it be desired to make use of the black field it is only necessary to turn the rotary shifting member slightly by hand in the direction of the arrow in Fig. 10 to release the slide bar 170 and permit the coiled spring 168 to slide the stop member 72 leftward until the stopping portion 73 thereon is in operative position.

It will be understood that the movements of the parts just referred to will operate to position the rotary shifting member with one of its lugs 189 engaging with the end of the stop 195 as shown in Fig. 19, and that during the subsequent operation of the machine said rotary member will remain quiescent in the position shown in Fig. 19. I provide means for controlling at will the ribbon fields when the rotary member is in the position shown in Fig. 19 and while there are no shifting members on the stop bar 123, said means being shown in Figs. 10, 11 and 12 and comprising a rod or bar 198 which is screwed or otherwise secured in the right-hand end (or as viewed from the rear as in Fig. 10, the left-hand end) of the slide bar 83, said rod 198 being of less diameter than the slide rod. As seen in Fig. 10 the right-hand end portion of the rod 198 extends through an opening or slot 199 formed in the side plate 200 of the machine for the passage therethrough of the ribbon driving shaft 47. Outside of the side plate 200, the end portion of the rod 198 has secured to it a knurled finger button 201. Normally or when the black field a of the ribbon is operative the finger button 201 stands away from the side plate 200 as shown in Fig. 12 and by the dotted lines in Fig. 10, it being maintained in this position by the spring 168. Near the finger button 201, the rod 198 is provided with a circumferential groove 202 which forms a short reduced section 203. The groove 202 is adapted to coöperate with a key-hole slot 204 formed in a locking plate 205 slidably mounted on the inner face of the side plate 200.

The locking plate 205 is provided with elongated slots 206 which receive small headed screws 207, said screws entering tapped holes in the inner face of the side plate 200. The construction is such that the locking plate is adapted to slide fore and aft of the machine on the shanks of the screws 207 to one position or another, the under side of the heads of said screws and the inner face of the side plate 200 acting to frictionally retain the plate 205 in desired position. The forward end portion of the locking plate 205 is bent laterally outward at right angles forming a handle or finger piece 208 by which said locking plate may be manipulated, said handle projecting through a cut-away or slot 209 in the side plate 200. Normally or when the black field of the ribbon is operative, the rod 198 passes through the larger end of the key hole slot 204, as shown in Figs. 11 and 12, the dimensions of the larger end of said slot being such that the to and fro movements of the rod during the operation of the automatic ribbon shifting or field changing devices are not interfered with. When as is now being considered the automatic ribbon field changing or shifting devices are inoperative and it is desired to use the upper or red field of the ribbon, the finger button 201 is pushed inwardly to the position shown in Fig. 10 to overcome the spring 168 and force the slide rod 83 and the stop member 72 leftward as viewed in said figure until the stopping portion 74 is in operative position. The inward movement of the rod 198 brings the circumferential groove 202 into the plane of the locking plate 205, so that the operator, still maintaining the finger button 201 pressed in, may push the finger piece 208 of the locking plate rearwardly, causing the narrow end of the key hole slot 204 to coöperate with the groove 202. The width of the narrow end of the key hole slot is slightly greater than the diameter of the reduced part 203 of the rod 198, but is not so great as the diameter of the rod outside the groove. Consequently the finger button 201 may now be released and the tendency of the spring 168 to restore the parts to the normal position will be overcome by the engagement of the right-hand wall of the groove 202 (as viewed in Fig. 10) with those portions of the right-hand face of the locking plate 205 which are above and below the narrow end of the key-hole slot 204. It will be apparent, therefore, that as long as the locking plate remains in its rearmost position, the slide rod 83 will be locked so as to maintain the stopping portion 74 of the stop member 72 in operative position, so that the red field of the ribbon may be used as long as desired. When it is necessary to again employ the black field the finger piece 208 may be pulled forward permitting the spring 168 to restore the slide rod and the member 72 to normal position. When it is again desired to make use of the automatic ribbon field changing or shifting mechanism it is only necessary to replace the special members like 192 on the stop bar 123, care being taken, of course, that the locking plate 205 is at this time in its forward position as shown in Fig. 11.

Various changes may be made in the several forms of my invention shown in the present application, and various modifications of the structures embodying the novel principles disclosed may be made use of within the scope of the present invention. Examples of such modified constructions form the subject-matter of other applications filed herewith by me and bearing Serial Nos. 332,950 and 332,951 but other modifications, differing in construction and arrangement but within the spirit of my present invention, will suggest themselves to those skilled in the art.

What I claim as new and desire to secure by Letters Patent, is:—

1. In a typewriting machine, the combination with a platen, printing instrumentalities, a ribbon having fields of different characteristics, and means for feeding the ribbon longitudinally, of means for automatically shifting a part of the ribbon mechanism at a predetermined point in the printing line to shift or change the ribbon field coöperative with the printing instrumentalities.

2. In a typewriting machine, the combination with a traveling element or carriage, printing instrumentalities, ribbon fields of different characteristics, and longitudinal-ribbon feeding means, of means operating automatically at a predetermined point in the carriage travel to shift or change the ribbon field coöperative with the printing instrumentalities when they are actuated.

3. In a typewriting machine, the combination with a carriage, printing instrumentalities, a ribbon having fields of different characteristics, and means for feeding the ribbon longitudinally, of means operating automatically at a predetermined point in the carriage travel to shift or change the ribbon field coöperative with the printing instrumentalities, said means being adjustable to vary the point in the carriage travel at which the shift or change of ribbon fields takes place.

4. In a typewriting machine, the combination with a carriage, printing instrumentalities, ribbon-fields of different characteristics, and longitudinal-ribbon feeding means, of shifting members, one operatively connected with the carriage and one on a fixed part, said members coöperating at a predetermined point in the carriage travel to change the ribbon field coöperative with the printing instrumentalities.

5. In a typewriting machine, the combination with a traveling element or carriage, printing instrumentalities, a ribbon having fields of different characteristics, and means for feeding the ribbon longitudinally, of two shifting members, one operatively connected with the carriage and one on a fixed part, said members being capable of coöperating during the movements of the carriage in both directions of its travel to change the ribbon field coöperative with the printing instrumentalities.

6. In a typewriting machine, the combination with a carriage, printing instrumentalities, a ribbon having fields of different characteristics, and means for feeding the ribbon longitudinally, of shifting members, one operatively connected with the carriage and one on a fixed part, said members coöperating at a predetermined point in the carriage travel to change the ribbon field coöperative with the printing instrumentalities, said members being relatively adjustable to vary the point in the carriage travel at which the change or shift of the ribbon fields takes place.

7. In a typewriting machine, the combination with a carriage, printing instrumentalities, a ribbon having fields of different characteristics, and means for feeding the ribbon longitudinally, of shifting members, one on the carriage and one on a fixed part, said members coöperating at a predetermined point in the carriage travel to change the ribbon field coöperative with the printing instrumentalities, the member on the carriage being adjustable to vary the point at which the change or shift of ribbon fields takes place.

8. In a typewriting machine, the combination with a platen, a traveling element or carriage, printing instrumentalities, a ribbon having fields of different characteristics and normally removed from the printing point, means for moving the ribbon to cover the printing point with one or another of its fields at printing operation, and means for feeding the ribbon lengthwise, of means operating automatically at a predetermined point in the carriage travel to change the ribbon field which covers the printing point when the printing instrumentalities are actuated.

9. In a typewriting machine, the combination with a platen, a carriage, printing instrumentalities, a ribbon having fields of different characteristics and normally removed from the printing point, moving means for moving the ribbon different extents to bring one or another of its fields to the printing point at printing operation, and means for effecting a lengthwise feed of the ribbon, of means operating automatically at a predetermined point in the carriage travel to effect said moving means to alter the extent of ribbon movement and thereby change the ribbon field which covers the printing point.

10. In a typewriting machine, the combination with a carriage, printing instrumentalities, and ribbon fields of different characteristics, of a ribbon-field-changer automatically operative at a predetermined point in the travel of the carriage, and means for automatically operating said field-changer.

11. In a typewriting machine, the combination with a carriage, printing instrumentalities, and ribbon fields of different characteristics, of ribbon carrying means, means for varying the extent of movement thereof to change from one ribbon field to another, and automatic means for operating the last named means at a predetermined point in the carriage travel.

12. In a typewriting machine, the combination with a carriage, printing instrumentalities, and a ribbon having fields of different characteristics, of a ribbon vibrator, means for varying the extent of movement thereof to change from one ribbon field to another, and automatic means for operating the last named means at a predetermined point in the carriage travel, said automatic means being adjustable for varying the point at which said automatic means operates.

13. In a typewriting machine, the combination with a carriage, printing instrumentalities, and a ribbon having fields of different characteristics, of a ribbon vibrator, means for varying the extent of movement thereof to change from one ribbon field to another, and shifting members one operatively connected with the carriage and one on a fixed part, said members coöperating automatically at a predetermined point in the carriage travel to actuate said varying means.

14. In a typewriting machine, the combination with a carriage, printing instrumentalities, a ribbon having fields of different characteristics, and a ribbon vibrator, of means for varying the extent of movement thereof to change from one ribbon field to another, and shifting members, one operatively connected with the carriage and one on a fixed part, said members coöperating automatically at a predetermined point in the carriage travel to actuate said means, and said members being relatively adjustable for varying the point at which they coöperate.

15. In a typewriting machine, the combination with a carriage, printing instrumentalities and a ribbon having fields of different characteristics, of a ribbon vibrator, and means for varying the extent of movement thereof to change from one ribbon field to another, said means including a spring-pressed stop member and shifting members, one shifting member being operatively connected with the carriage and one being on a fixed part, said shifting members coöperating automatically at a predetermined point in the carriage travel to overcome the force of the spring controlling said stop member and to re-adjust the latter to effect a change or shift of the ribbon fields.

16. In a typewriting machine, the combination of a ribbon vibrator, means for actuating the same, a stop member adjustable to effect a positive stoppage of said vibrator at different points in its movement towards the printing point, and means for automatically adjusting said stop member at a predetermined point in a line of writing.

17. In a typewriting machine, the combination of a ribbon vibrator, means for actuating the same, a stop member adjustable to effect a positive stoppage of said vibrator at different points in its movement towards the printing point, a spring normally controlling the position of said stop member, and means automatically acting to overcome the force of said spring and to re-adjust said stop member.

18. In a typewriting machine, the combination of a carriage, a ribbon vibrator, means for actuating the same, a stop member adjustable to effect a positive stoppage of said vibrator at different points in its movement towards the printing point, and means operating automatically to re-adjust said stop member at a predetermined point in the travel of the carriage.

19. In a typewriting machine, the combination of a carriage, a ribbon vibrator, means for actuating the same, a stop member adjustable to effect a positive stoppage of said vibrator at different points in its movement towards the printing point, and means operating automatically to re-adjust said stop member, whereby the ribbon may be used in parallel lines.

20. In a typewriting machine, the combination of a carriage, a ribbon vibrator, means for actuating the same, a stop member adjustable to effect a positive stoppage of said vibrator at different points in its movement towards the printing point, and means operating automatically to re-adjust said stop member, said means being adjustable for regulating or timing the automatic operation thereof.

21. In a typewriting machine, the combination of a carriage, a ribbon vibrator, means for actuating the same, a stop member adjustable to effect a positive stoppage of said vibrator at different points in its movement towards the printing point, and means operating automatically to re-adjust said stop member at a predetermined point in the travel of the carriage, said means being adjustable for varying said predetermined point.

22. In a typewriting machine, the combination of a carriage, a ribbon vibrator, means for actuating the same, a stop member adjustable to effect a positive stoppage of said vibrator at different points in its movement towards the printing point, and shifting members, one operatively connected with the carriage and one on a fixed part, said members coöperating at a predetermined point in the travel of the carriage to re-adjust said stop member.

23. In a typewriting machine, the combination of a carriage, a ribbon vibrator, means for actuating the same, a stop member adjustable to effect a positive stoppage of said vibrator at different points in its movement towards the printing point, and shifting members, one operatively connected with the carriage and one on a fixed part, said members coöperating at a predetermined point in the travel of the carriage to re-adjust said stop member, one of said members being adjustable relatively to the other to vary said predetermined point.

24. In a typewriting machine, the combination of a carriage, a ribbon vibrator, means for actuating the same comprising an operating lever, a stop member adjustable transversely of said operating lever and having a plurality of stopping portions coöperative with said lever to arrest the same at varying points, a shifting lever pivoted on a fixed part and operative to move said stop member, and a shifting member on the carriage operative on said shifting lever.

25. In a typewriting machine, the combination of a carriage, a ribbon vibrator, means for actuating the same comprising an operating lever, a stop member adjustable transversely of said actuating lever and having a plurality of stopping portions coöperative with said lever to arrest the same at varying points, a shifting lever pivoted on a fixed part and operative to move said stop member, and a shifting member on the carriage operative on said shifting lever to effect a readjustment of the stop member during movements of the carriage in both directions of its travel.

26. In a typewriting machine, the combination of a ribbon vibrator, actuating means therefor including an operating lever, ribbon feeding mechanism including a driving shaft, a rotary stop member adapted to turn with said driving shaft and comprising a plurality of cylindrical stopping portions of different diameters, and means for automatically shifting said member to bring one or another of said stopping portions into the path of the operating lever.

27. In a typewriting machine, the combination of a ribbon vibrator, actuating means therefor including an operating lever pivotally connected with the vibrator, a rotary stop member having a plurality of cylindrical stopping portions of different diameters, and means for automatically shifting said stop member to bring one or another of said stopping portions into position to limit the travel of said lever during printing operations.

28. In a typewriting machine, the combination of a ribbon vibrator, an operating lever having one arm connected with said vibrator, a key-actuated universal bar, an actuating link yieldingly connecting said universal bar with the other arm of said operating lever, a stop member having a plurality of stopping portions adapted to engage said lever to limit its movements, means for automatically actuating said stop member, and means for manually actuating said stop member.

29. In a typewriting machine, the combination of a ribbon vibrator, an operating lever having one arm connected with said vibrator, a key-actuated universal bar, an actuating link yieldingly connecting said universal bar with the other arm of said operating lever, a stop member having a plurality of stopping portions adapted to engage said lever to limit its movements, means for automatically actuating said stop member, and means for manually actuating said stop member, said manual means comprising a forked arm engaging said stop member, a shift rod connected with said forked arm, and a finger button or key.

30. In a typewriting machine, the combination of a ribbon vibrator, stop means operative to effect a positive arrest of the vibrator at different points in its movement towards the printing point, and means operating automatically to adjust said stop means bodily transversely of the vibrator, said last named means being constructed and arranged to be rendered inoperative for the purpose of changing ribbon fields.

31. In a typewriting machine, the combination of a ribbon vibrator, stop means operative to effect a positive arrest of the same at different points in its movement towards the printing point, means operating automatically to adjust said stop means bodily transversely of the vibrator, and means for manually operating said stop means.

32. In a typewriting machine, the combination of a ribbon vibrator, stop means operative to effect a positive arrest of the same at different points in its movement towards the printing point, means operating automatically to adjust said stop means, said automatic means being constructed and arranged to be rendered inoperative, and means for manually operating said stop means.

33. In a typewriting machine, the combination of a ribbon vibrator, a stop means operative to effect a positive arrest of the same at different points in its movement towards the printing point, and shifting devices operatively connected with said stop means and including a shifting member and a second shifting member operative to actuate said first named shifting member, said shifting members being constructed and arranged to be at will rendered inoperative for the purpose of changing ribbon fields.

34. In a typewriting machine, the combination of a ribbon vibrator, a stop means operative to effect a positive arrest of the same at different points in its movement towards the printing point, shifting devices operatively connected with said stop means and including a shifting member, a second shifting member operative to actuate automatically said first named shifting member, said shifting members being capable of being rendered inoperative for the purpose of shifting the ribbon fields, and hand actuated means for actuating said shifting devices.

35. In a typewriting machine, the combination with a traveling element or carriage, printing instrumentalities, a ribbon having fields of different characteristics, and means for feeding the ribbon longitudinally, of two shifting members, one operatively connected with the carriage and one on a fixed part, said members normally coöperating at a predetermined point in the carriage travel to change the ribbon field coöperative with the printing instrumentalities, said members being capable of being rendered inoperative, the one on the other, during the travel of the carriage.

36. In a typewriting machine, the combination with tabulating mechanism of inking means having a plurality of characteristics, and controlling mechanism for said inking means operative by said tabulating means.

37. In a typewriting machine, the combination of tabulating mechanism, a ribbon having fields of different characteristics, and means for printing with one field of the ribbon in one columnar field and for automatically shifting to print with another field of the ribbon in another columnar field.

38. In a typewriting machine, the combination of tabulating mechanism, a ribbon having fields of different colors, and automatically actuated ribbon controlling means for printing in one color in one columnar field and with another color in another columnar field.

39. In a typewriting machine, the combination with a carriage, step-by-step feeding mechanism therefor, types, ribbon fields of different characteristics, ribbon feeding mechanism and tabulative mechanism operative to arrest the carriage when released from its step-by-step feeding mechanism in predetermined columnar positions, of means operative during the movement of the carriage to a predetermined columnar position to change the ribbon field exposed to the action of the types.

40. In a typewriting machine, the combination with a carriage, step-by-step feeding mechanism therefor, types, a ribbon having fields of different characteristics, ribbon feeding mechanism and tabulating mechanism including stops operating to arrest the carriage when released from its step-by-step feeding mechanism in predetermined columnar positions, of means operative during the movement of the carriage to a predetermined columnar position to change the field of the ribbon exposed to the action of the types.

41. In a typewriting machine, the combination with a carriage, step-by-step feeding mechanism therefor, types, a ribbon normally removed from the printing point and having fields of different characteristics, means for moving the ribbon to and from the printing point, ribbon feeding mechanism, and tabulating mechanism including stops operative to arrest the carriage when released from its step-by-step feeding mechanism in predetermined columnar positions, of means operative during the movement of the carriage to a predetermined columnar position to alter the extent of movement of the ribbon so as to change the ribbon field exposed to the types.

42. In a typewriting machine, the combination with a carriage, step-by-step feeding mechanism therefor, types, a ribbon having fields of different characteristics, a ribbon vibrator, ribbon feeding mechanism and tabulating mechanism including stops operative to arrest the carriage when released from its step-by-step feeding mechanism in predetermined columnar positions, of means operative during the movement of the carriage to a predetermined columnar position to vary the throw of the vibrator and thereby change the working field of the ribbon.

43. In a typewriting machine, the combination with a carriage, step-by-step feeding mechanism therefor, types, a ribbon having fields of different characteristics, a vibrator, actuating devices for the vibrator, ribbon feeding mechanism, and tabulating mechanism including stops operative to arrest the carriage when released from its step-by-step feeding mechanism in predetermined columnar positions, of a stop member having a plurality of stop portions coöperative with certain of said vibrator actuating devices to arrest the same at different points, and means operative during the movement of the carriage to a predetermined columnar position to shift or re-adjust said stop member.

44. In a typewriting machine, the combination with a traveling element or carriage, printing instrumentalities, a ribbon having fields of different characteristics, and means for feeding the ribbon longitudinally, of means operating automatically at a predetermined point in the carriage travel in one direction to shift or change the ribbon field coöperative with the printing instrumentalities, said means being capable of operating during the return travel of the carriage to shift back or change to the ribbon field first operative.

45. In a typewriting machine, the combination with a carriage, printing instrumentalities, a ribbon having fields of different characteristics, and means for feeding the ribbon longitudinally, of means operating automatically at a predetermined point in the carriage travel in one direction to shift or change the ribbon field coöperative with the printing instrumentalities, said means being capable of operating during the return travel of the carriage to shift back or change to the ribbon field first operative, and being also capable of adjustment for varying the point in the carriage travel at which the shift or change of ribbon fields takes place.

46. In a typewriting machine, the combination with a carriage, printing instrumentalities, a ribbon having fields of different characteristics, and means for feeding the ribbon longitudinally, of shifting members, one operatively connected with the carriage and one on a fixed part, said members coöperating at a predetermined point in the carriage travel in one direction to change the ribbon field coöperative with the printing instrumentalities, and said members being capable of coöperating during the return travel of the carriage to shift back or change to the ribbon field first operative.

47. In a typewriting machine, the combination of a carriage, printing instrumentalities, a ribbon having fields of different characteristics, and means for feeding the ribbon longitudinally, of shifting members one operatively connected with the carriage and one on a fixed part, said members coöperating at a predetermined point in the carriage travel in one direction to change the ribbon field coöperative with the printing instrumentalities, and being relatively adjustable to vary the point at which the change or shift in the ribbon fields takes place, said members being capable of coöperating during the return travel of the carriage to shift back or change to the ribbon field first operative.

48. In a typewriting machine, the combination with a carriage, printing instrumentalities, a ribbon having fields of different characteristics, and means for feeding the ribbon longitudinally, of shifting members, one on the carriage and one on a fixed part, said members coöperating at a predetermined point in the carriage travel in one direction to change the ribbon field coöperative with the printing instrumentalities, the member on the carriage being adjustable to vary the point at which the change or shift of the ribbon takes place, and said members coöperating during the return travel of the carriage to shift back or change to the ribbon field first operative.

49. In a typewriting machine, the combination with a platen, a traveling element or carriage, printing instrumentalities, a ribbon having fields of different characteristics and normally removed from the printing point, means for moving the ribbon to cover the printing point with one or another of its fields at printing operations, and means for feeding the ribbon lengthwise, of means operating automatically at a predetermined point in the carriage travel in one direction to change the ribbon field which covers the printing point, said means being capable of operating during the return travel of the carriage to shift back or change to the ribbon field first operative.

50. In a typewriting machine, the combination with a carriage, printing instrumentalities, and a ribbon having fields of different characteristics, of a ribbon vibrator, means for varying the extent of movement thereof to change from one ribbon field to another, and automatic means for operating the last named means at a predetermined point in the carriage travel in one direction, said automatic means being capable of operating to restore said first named means to the first position during the return movement of the carriage 51. In a typewriting machine, in combination with a carriage, printing instrumentalities and a ribbon having fields of different characteristics, of a ribbon vibrator, means for varying the extent of movement thereof to change from one ribbon field to another, and shifting members, one operatively connected with the carriage and one on a fixed part, said members coöperating automatically at a predetermined point in the carriage travel in one direction to shift said varying means; said members being capable of coöperating during the return of the carriage to restore said varying means to its first position.

52. In a typewriting machine, the combination of a ribbon vibrator, means for actuating the same, a stop member adjustable to effect a positive stoppage of said vibrator at different points in its movement towards the printing point, and means operating automatically to readjust said stop member at a predetermined point in the travel of the carriage in one direction, said means being capable of operating during the return movement of the carriage to restore said stop member to first position.

53. In a typewriting machine, the combination of a carriage, a ribbon vibrator, means for actuating the same, a stop member adjustable to effect a positive stoppage of said vibrator at different points in its movement towards the printing point, and shifting members one operatively connected with the carriage and one on a fixed part, said members coöperating at a predetermined point in the travel of the carriage in one direction to readjust said stop member and being capable of coöperating during the return movement of the carriage to restore said stop member to first position.

54. In a typewriting machine, the combination with a carriage, step-by-step feeding mechanism therefor, types, a ribbon normally removed from the printing point and having fields of different characteristics, ribbon feeding mechanism and tabulating mechanism including stops operative to arrest the carriage when released from its step-by-step feeding mechanism in predetermined columnar positions, of means operative during the movement of the carriage to a predetermined columnar position to alter the extent of movement of the ribbon so as to change the ribbon field exposed to the types, said means being capable of operating during the return movement of the carriage to again render operative the ribbon field first operative.

55. In a typewriting machine, the combination with a carriage, step-by-step feeding mechanism therefor, types, a ribbon having fields of different characteristics, a vibrator, ribbon feeding mechanism, and tabulating mechanism including stops operative to arrest the carriage when released from its step-by-step feeding mechanism in predetermined columnar positions, of means operative during the movement of the carriage to a predetermined columnar position to vary the throw of the vibrator and thereby change the working field of the ribbon, said means being capable of operating during the return movement of the carriage to again render operative the ribbon field first operative.

56. In a typewriting machine, the combination with a carriage, step-by-step feeding mechanism therefor, types, a ribbon having fields of different characteristics, ribbon feeding mechanism, and tabulating mechanism including a plurality of stops coöperative to arrest the carriage when released from its step-by-step feeding mechanism in predetermined columnar positions, of means for printing with one field of the ribbon in one columnar field and for automatically shifting to print with another field of the ribbon in another columnar field, said means including certain of said tabulating stops, said certain stop or stops serving both as tabulating stops and ribbon field changing or shifting members.

57. In a typewriting machine, the combination with a carriage, step-by-step feeding mechanism therefor, types, a ribbon having fields of different characteristics, ribbon feeding mechanism and tabulating mechanism including a plurality of stops coöperative to arrest the carriage when released from its step-by-step feeding mechanism in predetermined columnar positions, of means operative during the movement of the carriage to a predetermined columnar position to change the field of the ribbon exposed to the action of the types, said means including certain of said tabulating stops, said certain stop or stops serving both as tabulating stops and ribbon field changing members.

58. In a typewriting machine, the combination with a carriage, step-by-step feeding mechanism therefor, types, a ribbon normally removed from the printing point and having fields of different characteristics, ribbon feeding mechanism, and tabulating mechanism including stops coöperative to arrest the carriage in predetermined columnar positions, of means operative during the movement of the carriage to a predetermined columnar position to alter the movement of the ribbon so as to change the ribbon field exposed to the types, said means including certain of said tabulating stops, said certain stop or stops serving both as tabulating stops and also as ribbon field changing members.

59. In a typewriting machine, the combination with a carriage, step-by-step feeding mechanism therefor, types, a ribbon having fields of different characteristics, a ribbon vibrator, actuating devices for the vibrator, ribbon feeding mechanism, and tabulating mechanism including stops operative to arrest the carriage in predetermined columnar positions, of a stop member having a plurality of stopping portions coöperative with certain of said vibrator actuating devices to arrest the same at different points, and means operative during the movement of the carriage to a predetermined columnar position to shift or readjust said stop member, said means including certain of said tabulating stops.

60. In a typewriting machine, the combination with a carriage, step-by-step feeding mechanism therefor, types, a ribbon having fields of different characteristics, a ribbon vibrator, actuating devices for the vibrator, ribbon feeding mechanism and tabulating mechanism including stops operative to arrest the carriage in predetermined columnar positions, of a stop member having a plurality of stopping portions coöperative with certain of said vibrator actuating devices to arrest the same at different points, and a shifting member coöperative with certain of said tabulating stops to shift or move said stop member so as to bring different stopping portions thereon into position to coöperate with the actuating devices for the vibrator.

61. In a typewriting machine, the combination with a carriage, step-by-step feeding mechanism therefor, types, a ribbon having fields of different characteristics, a ribbon vibrator, actuating devices for the vibrator, ribbon feeding mechanism and tabulating mechanism including stops coöperative to arrest the carriage in predetermined columnar positions, of a stop member having a plurality of stopping portions coöperative with certain of said vibrator actuating devices to vary the extent of movement thereof, means for shifting said stop member comprising a forked arm and a push rod, and means for actuating said push rod, said means including a shifting member mounted on a fixed part and coöperating with certain of said tabulating stops to effect an actuation of said push rod during the run of the carriage to a predetermined columnar position.

62. In a typewriting machine, the combination with a traveling element or carriage, printing instrumentalities, and ribbon fields of different characteristics, of means operating automatically to change the ribbon field coöperative with the printing instrumentalities, said means comprising a rotary shifting member and a coöperative shifting member, one of said members being mounted on a fixed part and one being operatively connected with the carriage.

63. In a typewriting machine, the combination with a traveling element or carriage, printing instrumentalities, a ribbon having fields of different characteristics, and means for feeding the ribbon longitudinally, of a two-part rotary shifting member mounted on the frame of the machine, and a coöperative shifting member operatively connected with the carriage, said members being capable of coöperation during movements of the carriage in both directions of its travel to change the ribbon field exposed to the action of the printing instrumentalities.

64. In a typewriting machine, the combination with a traveling element or carriage, printing instrumentalities, a ribbon having fields of different characteristics, and means for feeding the ribbon longitudinally, of means operating automatically to change the ribbon field coöperative with the printing instrumentalities, said means including a wheel rotatable a predetermined extent at a predetermined point in the travel of the carriage.

65. In a typewriting machine, the combination with a traveling element or carriage, printing instrumentalities, a ribbon having fields of different characteristics, and means for feeding the ribbon longitudinally, of means operating automatically to change the ribbon field coöperative with the printing instrumentalities, said means including a rotary shifting member provided with a plurality of lugs or abutments and a slidable member or bar operative by said abutments, the action and re-action of said two members on one another being such that one of them prevents movement of the other in one direction but at the same time is itself capable of movement in either direction.

66. In a typewriting machine, the combination of a carriage, printing instrumentalities, a ribbon having fields of different characteristics, a ribbon vibrator, means for actuating the same, a stop member adjustable to effect a positive stoppage of said vibrator at different points in its movement towards the printing point, whereby one or another of the ribbon fields may be employed, and means for automatically adjusting said stop member, said means including a toothed wheel rotatable a predetermined extent at one or more predetermined points in the travel of the carriage.

67. In a typewriting machine, the combination with a traveling element or carriage, printing instrumentalities, a ribbon having fields of different characteristics, and means for feeding the ribbon longitudinally, of means operating automatically to change the ribbon field coöperative with the printing instrumentalities, said means including a slidable member or bar, a toothed rotary member and one or more contact members operatively connected with the carriage and operative on said toothed member, the latter being provided with a plurality of lugs or abutments adapted to communicate motion to said slidable member or bar.

68. In a typewriting machine, the combination with a traveling element or carriage, printing instrumentalities, a ribbon having fields of different characteristics, and means for feeding the ribbon longitudinally, of means operating automatically to change the ribbon field coöperative with the printing instrumentalities, said means including one or more members mounted on the carriage and adjustable longitudinally thereof and a rotary shifting member coöperative with said adjustable members, said rotary shifting member comprising a toothed wheel and a disk provided with lugs or abutments and yieldingly connected with said toothed wheel, said toothed wheel being adapted to be turned in either direction by said adjustable members.

69. In a typewriting machine, the combination of a carriage, a ribbon having fields of different characteristics, a ribbon vibrator, actuating devices therefor, a stop member having a plurality of stopping portions coöperative with certain of said vibrator-actuating devices, one or more shifting or contact members mounted on the carriage, a coöperative shifting member mounted on the frame and comprising a toothed wheel coöperating with said contact members and a disk provided with a plurality of lugs or abutments and yieldingly connected with said toothed wheel, and a slidable bar or member movable by said abutments, said slidable member being operatively connected with said stop member and operative on the same to move it to bring one or another of its stopping portions into operative position.

70. In a typewriting machine, the combination of a carriage, a ribbon vibrator, means for actuating the same, a stop member adjustable to effect a positive stoppage of said vibrator at different points in its travel towards the printing point, a spring normally controlling the position of said stop member, and means automatically acting to overcome the force of said spring and to re-adjust said stop member, said last recited means comprising an adjustable contact member on the carriage, a toothed rotary member pivoted on the frame and provided with a plurality of lugs, the teeth of said member being co-active with said contact member, and a slidable bar or member movable by said lugs and operatively connected with said stop member.

71. In a typewriting machine, the combination of a carriage, a ribbon vibrator, means for actuating the same, a stop member adjustable to effect a positive stoppage of said vibrator at different points in its travel towards the printing point, a spring normally controlling the position of said stop member, means automatically acting to overcome the force of said spring and to re-adjust said stop member, said means being capable of being rendered inoperative, and manual means operative to re-adjust said stop member when said automatic means is inoperative.

72. In a typewriting machine, the combination of a carriage, a ribbon vibrator, means for actuating the same, a stop member adjustable to effect a positive stoppage of said vibrator at different points in its travel towards the printing point, a spring normally controlling the position of said stop member, means automatically acting to overcome the force of said spring and to re-adjust said stop member, said means being capable of being rendered inoperative, and manual means operative to re-adjust said stop member when said automatic means is inoperative, said manual means comprising a grooved rod connected with said stop member and a slotted locking plate coöperative with said grooved rod.

73. In a typewriting machine, the combination of printing instrumentalities, inking means automatically operative to afford a writing of a portion of a line with an ink of one character and another portion of the same line with an ink of another character, and adjustable means for predetermining the point in the line where the automatic shift from one ink to another shall be effected.

74. In a typewriting machine, the combination of printing instrumentalities, a platen, and means for affording a writing of a predetermined portion of a line in one color and for automatically shifting at a predetermined point in the line to afford writing in another color.

75. In a typewriting machine, the combination with a carriage and types arranged to print at a common center, of a shift device operating automatically during the course of the writing to change the character of the printing at a predetermined point in the line of writing.

76. In a typewriting machine, the combination with a carriage and types arranged to print at a common center, of a shift device for automatically changing the character of the printing at a predetermined point in the line of writing, said means being adjustable to vary the point in the line of writing at which the change in the character of printing occurs.

77. In a typewriting machine, the combination with types and a platen, of means for affording a writing at a predetermined portion of a line in one color and for automatically shifting at a predetermined point in the line during the manipulation of the writing keys to afford a writing in another color, said automatic shifting means being capable of being brought into and out of operation at will by an operation separate and distinct from said manipulation of the writing keys.

78. In a visible typewriting machine, the combination with types, a carriage and a ribbon vibrating means, of means for operating said ribbon vibrating means, and means operated by the carriage and automatically controlling the operation of said ribbon vibrating means to print in different colors at different parts of the line of writing.

79. In a typewriting machine, the combination with types, a carriage and tabulating devices for writing in columns, of means for automatically changing the character of the writing so as to write one of said columns differently from the remainder of the writing.

80. In a typewriting machine, the combination with a carriage, types and printing keys for actuating said types, of means for automatically changing the character of the printing at a predetermined point in the line of writing and for again changing the character of the printing at another predetermined point.

81. In a typewriting machine, the combination with a carriage, types and printing keys for actuating said types, of means for automatically changing the character of the printing at a predetermined point in the line of writing and for changing back to the first character of printing at another predetermined point in the same line of writing.

82. In a typewriting machine, the combination with a carriage, types, printing keys for actuating said types and inking devices of different characteristics coöperating with said types, of means for automatically changing from one character of ink to another at a predetermined point in the line of writing.

83. In a typewriting machine, the combination with a carriage, types, printing keys for actuating said types and inking devices of different characteristics coöperating with said devices, of means for automatically changing from one character of ink to another at a predetermined point in the line of writing and for automatically changing back to the original character of ink at another point in the line of writing.

84. In a typewriting machine, the combination of a tabulating mechanism, ribbon fields of different characteristics, means for printing from one ribbon field in one columnar field, and means for automatically changing to print from another ribbon field in another columnar field.

85. In a typewriting machine, the combination with a carriage, printing instrumentalities, and ribbon mechanism for ribbon fields of different characteristics, of means comprising parts coöperative to effect a change in the ribbon mechanism whereby a different ribbon field from that normally presented may be presented at the printing point, and means for separating said coöperative parts to again effect a change of ribbon fields.

86. In a typewriting machine, the combination with a carriage, printing instrumentalities, and means for feeding lengthwise ribbon fields of different characteristics, of shifting members coöperative to change the relation between the ribbon fields and the printing instrumentalities, said change remaining only so long as the shifting members are in coöperation, and means for again changing the ribbon fields relatively to the printing instrumentalities when coöperation between said members ceases.

87. In a typewriting machine, the combination with a carriage, printing instrumentalities, a ribbon having fields of different characteristics, and means for feeding the ribbon longitudinally, of shifting members coöperative to change the relation between the printing instrumentalities and the fields of said ribbon, the change remaining only so long as the shifting members are in coöperation, and means for again changing the fields of the ribbon relatively to the printing instrumentalities when coöperation between said members ceases.

88. In a typewriting machine, the combination with a platen, a traveling element, printing instrumentalities, means for feeding lengthwise ribbon fields of different characteristics, said ribbon fields being normally removed from printing point, and means for covering the printing point with a ribbon field, of ribbon field-changing means comprising a contact member coöperative with the means for moving a ribbon field to the printing point, shifting members coöperating automatically to shift said contact member and effect a change in the ribbon field which is brought to the printing point, the change of field remaining only so long as said members remain in coöperative engagement, and means for again effecting a change of ribbon field when coöperation between said members ceases.

89. In a typewriting machine, the combination with a carriage and printing mechanism including printing surfaces of different characteristics, of means operative at a predetermined point in the travel of the carriage to change automatically from one printing surface to another.

Signed at Syracuse, in the county of Onondaga, and State of New York, this 30th day of August, A. D. 1906.

HERBERT H. STEELE.

Witnesses:
JOHN S. MITCHELL,
W. J. LOGAN.